(12) United States Patent
Saitou et al.

(10) Patent No.: US 8,060,167 B2
(45) Date of Patent: Nov. 15, 2011

(54) PORTABLE WIRELESS MACHINE

(75) Inventors: Yutaka Saitou, Ishikawa (JP); Yoshio Koyanagi, Kanagawa (JP); Kenichi Yamada, Kanagawa (JP); Masashi Koshi, Ishikawa (JP); Yukari Yamazaki, Ishikawa (JP)

(73) Assignee: Panasonic Corporation, Osaka (JP)

( * ) Notice: Subject to any disclaimer, the term of this patent is extended or adjusted under 35 U.S.C. 154(b) by 99 days.

(21) Appl. No.: 10/521,490

(22) PCT Filed: Jun. 26, 2003

(86) PCT No.: PCT/JP03/08149
§ 371 (c)(1),
(2), (4) Date: Jan. 18, 2005

(87) PCT Pub. No.: WO2004/010530
PCT Pub. Date: Jan. 29, 2004

(65) Prior Publication Data
US 2005/0239519 A1    Oct. 27, 2005

(30) Foreign Application Priority Data

Jul. 19, 2002 (JP) .................. 2002-210612
Jan. 24, 2003 (JP) .................. 2003-015675
Jun. 12, 2003 (JP) .................. 2003-167962

(51) Int. Cl.
H04M 1/00    (2006.01)
(52) U.S. Cl. ............... 455/575.7; 455/575.3; 455/550.1
(58) Field of Classification Search .............. 455/129, 455/575.1, 575.3, 575.7, 550.1, 562.1, 575.5, 455/90.3
See application file for complete search history.

(56) References Cited

U.S. PATENT DOCUMENTS

| | | | | |
|---|---|---|---|---|
| 4,471,493 A | * | 9/1984 | Schober | 455/575.7 |
| 5,014,346 A | | 5/1991 | Phillips et al. | |
| 5,170,173 A | | 12/1992 | Krenz et al. | |
| 5,337,061 A | * | 8/1994 | Pye et al. | 455/575.7 |
| 5,542,106 A | * | 7/1996 | Krenz et al. | 455/575.7 |
| 5,554,996 A | * | 9/1996 | Chatzipetros | 455/575.7 |
| 5,561,437 A | | 10/1996 | Phillips et al. | |
| 5,649,306 A | * | 7/1997 | Vannatta et al. | 455/575.7 |
| 6,011,699 A | * | 1/2000 | Murray et al. | 361/814 |
| 6,067,449 A | * | 5/2000 | Jager | 455/277.2 |

(Continued)

FOREIGN PATENT DOCUMENTS

EP    0 643 436 A1    3/1995

(Continued)

OTHER PUBLICATIONS

European Search Report.

(Continued)

*Primary Examiner* — Ping Hsieh
(74) *Attorney, Agent, or Firm* — Pearne & Gordon LLP

(57) ABSTRACT

An upper case (1) is connected to a lower case (2) in a hinge portion (3) so as to freely rotate. A plate shaped conductor (4) and a plate shaped conductor (5) are disposed along the surface of the case in the upper case (1). A ground plate (6) is formed in a ground pattern of a circuit board disposed in the lower case (2). The plate shaped conductor (4) and the plate shaped conductor (5) are selected by a high frequency switch (14) and connected to one end of a feeding portion (15). The other end of the feeding portion (15) is connected to the ground plate (6) to form a dipole antenna.

27 Claims, 28 Drawing Sheets

U.S. PATENT DOCUMENTS

| | | | |
|---|---|---|---|
| 6,307,511 B1 * | 10/2001 | Ying et al. | 343/702 |
| 6,327,485 B1 | 12/2001 | Waldron | |
| 6,405,061 B1 * | 6/2002 | Bae | 455/566 |
| 6,456,247 B1 * | 9/2002 | Hulick et al. | 343/702 |
| 6,549,789 B1 * | 4/2003 | Kfoury | 455/550.1 |
| 6,876,875 B2 * | 4/2005 | Shimazaki et al. | 455/575.1 |
| 2002/0169010 A1 * | 11/2002 | Shoji et al. | 455/575 |
| 2003/0050032 A1 * | 3/2003 | Masaki | 455/272 |
| 2003/0148784 A1 * | 8/2003 | Sawamura et al. | 455/550 |

FOREIGN PATENT DOCUMENTS

| | | |
|---|---|---|
| EP | 1 056 220 A3 | 11/2000 |
| EP | 1 258 943 A1 | 11/2002 |
| JP | 01-198121 | 8/1989 |
| JP | 2-90511 | 7/1990 |
| JP | 03-280625 | 12/1991 |
| JP | 6-31798 | 8/1994 |
| JP | 06-216621 | 8/1994 |
| JP | 08-078949 | 3/1996 |
| JP | 09-064778 | 3/1997 |
| JP | 9-93227 | 4/1997 |
| JP | 09-093227 A | 4/1997 |
| JP | 10-065440 | 3/1998 |
| JP | 10/084406 | 3/1998 |
| JP | 10-190330 | 7/1998 |
| JP | 10-190345 | 7/1998 |
| JP | 10-190345 A | 7/1998 |
| JP | 10-224142 | 8/1998 |
| JP | 10-308618 | 11/1998 |
| JP | 11/068901 | 3/1999 |
| JP | 11-136025 | 5/1999 |
| JP | 2000-261532 | 9/2000 |
| JP | 2000-278024 | 10/2000 |
| JP | 2000-341017 | 12/2000 |
| JP | 2001-045123 | 2/2001 |
| JP | 2001-077611 | 3/2001 |
| JP | 2001-156898 | 6/2001 |
| JP | 2001-284934 | 10/2001 |
| JP | 2001-358802 | 12/2001 |
| JP | 2002-064314 | 2/2002 |
| JP | 2002-335180 | 11/2002 |
| WO | 00/72406 A1 | 11/2000 |
| WO | 01/29927 A1 | 4/2001 |
| WO | WO 01/29927 | 4/2001 |
| WO | 02/03665 A1 | 1/2002 |
| WO | WO 02/03665 A1 | 1/2002 |

OTHER PUBLICATIONS

European Office Action dated Mar. 19, 2010.

* cited by examiner

PORTABLE WIRELESS MACHINE

TECHNICAL FIELD

The present invention relates to a portable radio device such as a portable telephone, and more particularly to a portable radio device having a collapsible casing.

BACKGROUND ART

A portable radio device with a collapsible structure ordinarily has a mechanism including an upper casing and a lower casing connected by a hinge so as to be freely open and close. Thus, the portable radio device can take an opening state and a closing state. The portable radio device has two advantages of a high visibility and an easy portability that a viewable display screen can be enlarged under a state that the device is opened and used (namely, an opening state) and the device can be made compact under a state that the device is closed and used (a closing state) from the viewpoint of such structural characteristics.

As an antenna of a foldable portable telephone, a protrusion type antenna disposed in a casing is disclosed in JP-A-2001-45123.

For such a protrusion type antenna, a helical antenna or an extensible mono-pole antenna is ordinarily employed. Since the antenna portion protrudes from the casing, an antenna gain can be raised while a hand holds the portable telephone.

However, since the antenna portion is protruded, when the portable telephone is taken out from a pocket or the like, the antenna may be sometimes caught by a part of the pocket so that the portable telephone is hardly taken out.

As compared therewith, as an antenna contained in the casing of the foldable portable telephone, a strip line antenna is disclosed in JP-A-10-308618. Further, in JP-A-2001-284934, a hinge portion contained antenna is disclosed. Further, in JP-A-2001-156898, an antenna contained in an upper casing is disclosed.

Still further, as a flip type antenna contained in the casing of the portable telephone, a coil type antenna is described in JP-A-9-64778 and a micro-strip line antenna is described in JP-A-10-190330.

Further, JP-A-10-84406 discloses a plurality of element contained antenna in which a dipole antenna as a radiation element contained in an upper casing is combined with a non-feeding element contained in a lower casing.

Since the above-described antenna contained in the casing has no part protruding from the casing, the antenna is not caught by a part of the pocket or the like. However, since the direction of a main polarized wave emitted from the antenna is limited to a specific direction, a difference is undesirably generated in the antenna gain between a case that the portable telephone is held by a left hand during speaking (a left hand speaking state) and a case that the portable telephone is held by a right hand (a right hand speaking state).

Further, in the hinge portion contained antenna, under a state in which the portable telephone is allowed to come near to the ear and the mouth to speak (refer this state as to a speaking state, hereinafter), when the hinge portion is held by a hand, the antenna gain may be sometimes undesirably deteriorated, because the antenna portion is covered with the hand.

Further, in the flip part contained antenna, while the flip part is closed, a portable telephone main body is allowed to come near to the antenna portion so that the antenna gain may be possibly deteriorated.

Still further, in the plurality of element contained antenna, while the upper and lower casings are opened to speak, when a part near the radiation element is covered with a hand, the antenna gain may be undesirably deteriorated.

It is an object of the present invention to provide a portable radio device having an antenna with a high performance under various using states.

DISCLOSURE OF THE INVENTION

A portable radio device according to the present invention comprises: a first casing; a second casing; a connection portion connecting the first casing to the second casing so as to freely rotate; a first antenna element provided in the first casing; a conductor element provided in the second casing to form a dipole antenna together with the first antenna element; and a feeding portion having one end electrically connected to the first antenna element and the other end electrically connected to the conductor element.

According to this structure, the antenna elements respectively accommodated in the first and second casings integrally operate as the dipole antenna. Thus, under a using state in which the portable radio device is held by a hand, a high antenna gain can be operationally obtained.

Further, in the portable radio device according to the present invention, a plurality of first antenna elements are provided in the first casing and a switching portion is further provided for switching the plurality of first antenna elements to connect them to the feeding portion.

According to this structure, a directional diversity effect can be obtained. Under a speaking state, even when the portable radio device is held by either of a left hand and a right hand, a high antenna gain can be obtained.

Further, in the portable radio device according to the present invention, the switching portion switches whether the plurality of the first antenna elements are electrically connected to the feeding portion or electrically connected to the conductor element, respectively.

According to this structure, a diversity effect having a higher directivity is operationally obtained.

Further, in the portable radio device according to the present invention, a half-wavelength element electrically connected between at least one of the plurality of the first antenna elements and the switching portion is further provided.

According to this structure, even when the portable radio device is closed, a high antenna performance is obtained.

Further, in the portable radio device according to the present invention, a plurality of half-wavelength elements respectively electrically connected to the plurality of the first antenna elements are further provided and the switching portion selectively switches the plurality of the first antenna elements and the plurality of the half-wavelength elements to connect them to the feeding portion.

According to this structure, even when the portable radio device is closed, a high antenna performance can be obtained and a directional diversity effect can be also obtained.

Further, in the portable radio device according to the present invention, impedance matching portions respectively individually corresponding to the plurality of the first antenna elements are further provided.

According to this structure, even when the portable radio device is closed, the high antenna performance can be obtained.

Further, the portable radio device according to the present invention further comprises: a casing opening and closing state detecting portion for detecting whether or not the first casing and the second casing are mutually opened; and a control portion for controlling the switching portion in accordance with the detected result of the casing opening and closing state detecting portion.

According to this structure, a high antenna performance corresponding to the opening or the closing state of the portable radio device can be obtained.

Further, in the portable radio device according to the present invention, a control portion is further provided for deciding the receiving level of a radio circuit portion to control the switching portion to raise the receiving level.

According to this structure, a high antenna performance can be always ensured under various using states of the portable radio device.

Further, in the portable radio device according to the present invention, the antenna element and the conductor element are respectively formed in plate shapes along the surfaces of the first casing and the second casing.

According to this structure, the first antenna element and the conductor element are respectively incorporated in the first casing and the second casing. However, the first casing and the second casing can be respectively formed with small thickness, so that they can sufficiently operationally meet a light and thin portable radio device.

Further, in the portable radio device according to the present invention, a circuit board formed in the second casing and having a radio circuit is further provided. The conductor element is formed in a ground pattern formed on the circuit board disposed in the second casing. A ground of the radio circuit portion is electrically connected to the ground pattern and the feeding portion is provided in the radio circuit portion.

According to this structure, a high antenna performance can be ensured and a thin portable radio device can be easily formed.

Further, the portable radio device according to the present invention further comprises: a second antenna element provided in the second casing near the connection portion; an opening and closing state detecting portion for detecting the opening and closing states of the first casing and the second casing; and a switching portion for selecting and switching any one of the first antenna element and the second antenna element to a connection to a signal processing portion for performing a signal process. When the first casing and the second casing are opened, the first antenna element and the conductor element form the dipole antenna, and when the first casing and the second casing are closed, the second antenna element and the conductor element form a mono-pole antenna.

According to this structure, even when the first casing and the second casing are opened or closed, the high antenna performance can be assured.

Further, in the portable radio device according to the present invention, when the first casing and the second casing are opened, the switching portion selects the first antenna element, and when the upper casing and the lower casing are closed, the switching portion selects the second antenna element.

According to this structure, even when the upper casing and the lower casing are opened or closed, the high antenna performance can be assured.

Further, the portable radio device according to the present invention further comprises: a second antenna element provided in the second casing near the connection portion; a receiving field intensity measuring portion for measuring the receiving field intensity of a signal received by the first antenna element or the second antenna element; and a switching portion for selecting and switching the antenna element having a higher receiving field intensity to a connection to a signal processing portion for performing a signal process in accordance with the measured result of the receiving field intensity measuring portion. The first antenna element has a first feeding point to be electrically connected to the conductor element. The second antenna element has a second feeding point to be electrically connected to the conductor element. The first feeding point and the second feeding point are provided at the diagonal positions of opposed sides when the first casing and the second casing are opened.

According to this structure, a high antenna gain can be obtained either in a speaking sate by using a left hand or in a speaking state by using a right hand.

Further, the portable radio device according to the present invention further comprises: a first matching portion for matching the impedance of the first antenna element to a prescribed value; and a second matching portion for matching the impedance of the second antenna element to a prescribed value.

According to this structure, a high antenna performance can be ensured.

Further, the portable radio device according to the present invention further comprises: a circuit board provided in the second casing; a plurality of feeding portions mutually separated from others for feeding electric current to the antenna element; a radio circuit disposed in the circuit board; and a switching portion provided between the plurality of feeding portions and the radio circuit to select and connect any one of the plurality of the feeding portions to the radio circuit.

According to this structure, a feeding position to the first antenna element can be changed. Accordingly, since directivity can be changed, a directional diversity effect can be obtained and a high antenna performance can be obtained in a speaking state.

The portable radio device according to the present invention further comprises: a circuit board provided in the second casing; a radio circuit disposed in the circuit board- and electrically connected to the feeding portion; a ground portion spaced from the feeding portion to connect the antenna element to the circuit board; and a switching portion for switching whether the ground portion is connected to the circuit board or the circuit board and the ground portion are opened.

According to this structure, whether or not a part of the first antenna element separated from the feeding portion is grounded in the circuit board can be switched. Accordingly, since directivity can be changed, a directional diversity effect can be obtained and a high antenna performance can be obtained in a speaking state.

Further, in the portable radio device according to the present invention, a plurality of ground portions are provided and the ground portions are disposed to be spaced apart in the end part of the antenna element connected to the second casing.

According to this structure, since the directivity can be changed, the directional diversity effect can be obtained and the high antenna performance can be obtained in a speaking state.

Further, in the portable radio device according to the present invention, the switching portion switches the ground portions respectively.

According to this structure, whether or not each part of the first antenna element separated from the feeding portion is grounded in the circuit board can be switched. Accordingly, since the directivity can be changed, the directional diversity effect can be obtained and the high antenna performance can be obtained in a speaking state.

Further, in the portable radio device according to the present invention, the connection portion has an electric conductivity and the ground portion is electrically connected to the antenna element through the connection portion.

According to this structure, the connection portion itself can serve as a feeder. Accordingly, a step for providing the feeder is not required, so that the number of assembling steps can be reduced and a cost can be decreased.

Further, in the portable radio device according to the present invention, the connection portion has an electric conductivity and the feeding portion is electrically connected to the antenna element through the connection portion.

Accordingly to this structure, the connection portion itself can serve as a feeder. Accordingly, a step for providing the feeder is not required, so that the number of assembling steps can be reduced and a cost can be decreased.

Further, the portable radio device according to the present invention further comprises: a control circuit for controlling the switching portion in accordance with the level of a receiving signal received by the radio circuit.

According to this structure, the feeding portion or the ground portion is switched in accordance with the level of the receiving signal. Accordingly, even when the portable radio device is held by either a left hand or a right hand in a speaking state, a high antenna performance can be obtained.

Further, in the portable radio device according to the present invention, the first antenna element is an electric conductive frame forming a part of the first casing.

According to this structure, since the electric conductive frame forming a part of the upper casing is used as the antenna element, the thickness of the portable radio device can be decreased.

Figure 1:
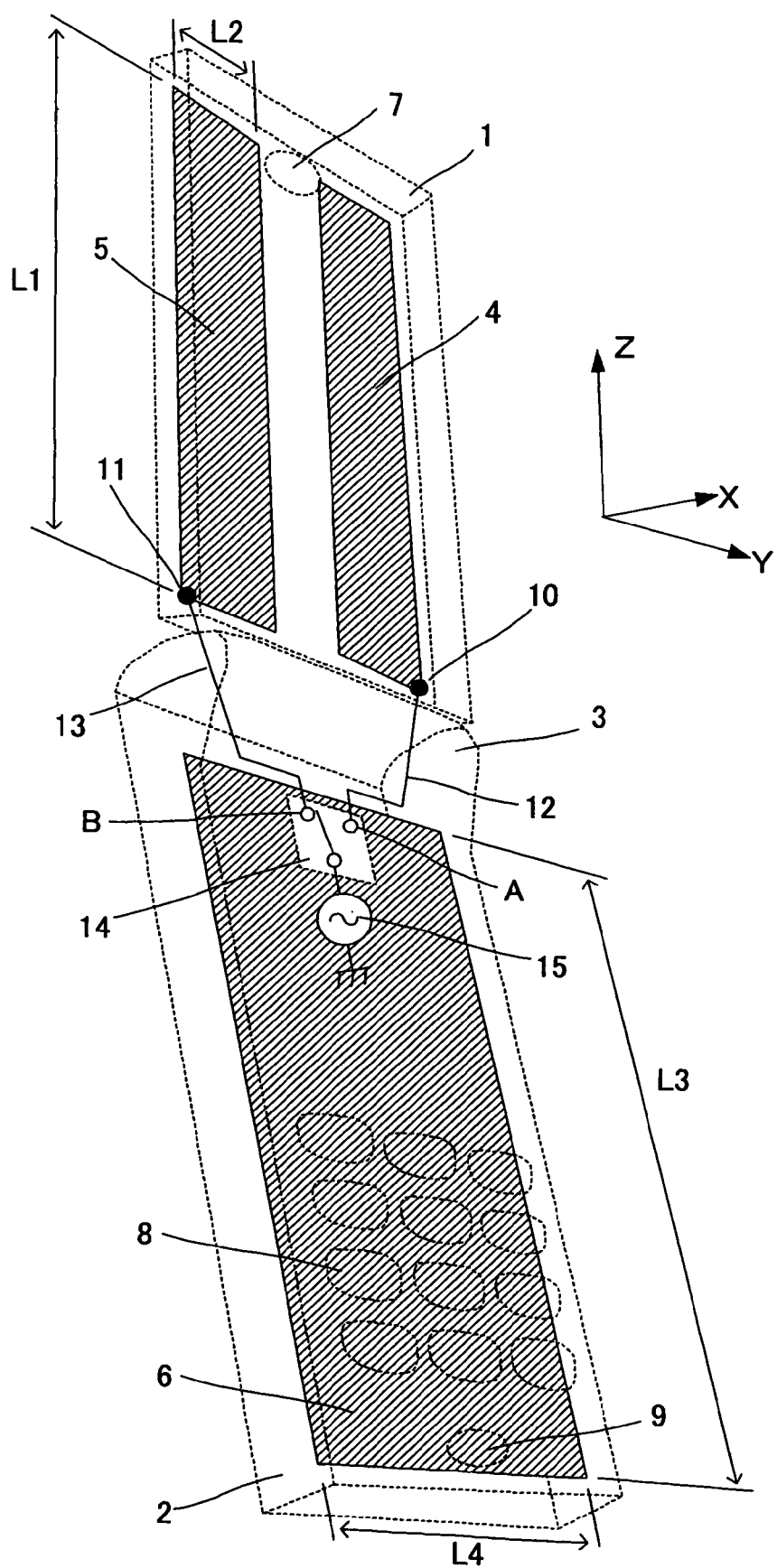
FIG. 1 is a schematic structural diagram of a portable radio device in a first embodiment of the present invention.

In the drawings, reference numerals 1, 104 and 210 designate upper cases, 2, 105 and 211 designate lower cases, 3, 106, 212a, 212b and 212c designate hinge portions, 4 designates a plate shaped conductor, 5 designates a plate shaped conductor, 6 designates a ground plate, 7 designates a speaker, 8 designates an operating key, 9 designates a microphone, 10, 11, 34, 35, 108 and 113 designate feeding points, 12 and 13 designate feeders, 14, 24, 25, 31, 33 and 36 designate high frequency switches, 15 designates a feeding portion, 30 and 32 designate helical elements, 37, 38, 110 and 114 designate matching circuits, 39 designates a control portion, 40 designates a magnet switch, 41 designates a permanent magnet, 42 designates a printed circuit board, 43 designates a ground pattern, 44, 112 and 224 designate radio circuit portions, 45 designates a level deciding portion, 101 and 102 designate antenna elements, 103 and 221 designate circuit boards, 111 designates a high frequency switch, 127 designates a switch control portion, 128 designates an opening and closing detecting portion, 203 and 204 designate feeding portions, 205, 206, 222a, 222b and 228 designate matching circuits, 213 designates a sound port, 214 designates a metal frame, 215a, 15b, 15c, 19a, 19b and 19c designate hinge fittings, 216 and 229 designate attaching screws, 217 and 226 designate tapped hole parts, 218a, 218b and 218c designate rotating shafts, 220a, 220b and 220c designate feeding terminals, 223, 227a and 227b designate switches and 225 designates a control circuit portion.

BEST MODE FOR CARRYING OUT THE INVENTION

First Embodiment

FIG. 1 is a schematic structural diagram of a portable radio device in a first embodiment of the present invention. The portable radio device in this embodiment is a portable radio device having a foldable structure and is shown in an opened state (refer this state as to an opening state, hereinafter) in FIG. 1. The portable radio device includes an upper case 1, a lower case 2, a hinge portion 3, a plate shaped conductor 4, a plate shaped conductor 5, a ground plate 6, a speaker 7, an operating key 8 and a microphone 9.

The upper case 1 and the lower case 2 as one example of a first casing and a second casing are formed with a resin as an insulator and ordinarily set to the length of about 10 mm and the width of about 50 mm. The upper case 1 and the lower case 2 are respectively connected in the hinge portion 3 so as to freely rotate. Thus, a foldable or a collapsible structure is formed.

In the upper end part of the upper case 1, the speaker 7 is disposed. In the lower end part of the lower case 2, the microphone 9 is disposed respectively. In a speaking state that a user holds the portable radio device by a hand to speak, the user can use the portable radio device by allowing the speaker 7 to come near to the ear and the microphone 9 to come near to the mouth respectively.

The plate shaped conductors 4 and 5 as one example of a first antenna element are made of a copper plate having, for instance, the length L1 of about 90 mm and the width L2 of about 15 mm. The plate shaped conductors 4 and 5 are disposed along the surface of the upper case 1 in the inner part of the upper case 1. Further, the thickness of the plate shaped conductors 4 and 5 is set to, for instance, about 0.1 mm. The plate shaped conductors 4 and 5 are disposed so as not to structurally interfere with other components such as the speaker 7 or a display element in the inner part of the upper case 1 having the thickness as thin as, for instance, about 6 mm.

The ground plate 6 as one example of a conductor element is made of, for instance, a conductor plate having the length L3 of about 90 mm and the width L4 of about 45 mm. The ground plate may use a ground pattern of a circuit board disposed in the lower case 2. The ground plate 6 whose thickness is set to 1 mm or smaller is disposed so as not to structurally interfere with other components such as the operating key 8 or the microphone 9 in the lower case 2.

A feeding point 10 and a feeding point 11 provided in the lower parts of the plate shaped conductor 4 and the plate shaped conductor 5 are electrically connected to a high frequency switch 14 by a feeder 12 and a feeder 13. As the feeder 12 and the feeder 13, a flexible wire rod that can be freely bent is used. Thus, the upper case 1 can rotate in the hinge portion 3.

The high frequency switch 14 is formed by, for instance, an FET or a PIN diode to suitably select the high frequency signals of the feeder 12 and the feeder 13 (suitably select a larger one of the high frequency signals on the basis of, for instance, the directions of the cases 1 and 2 or the magnitude of the high frequency signals of the feeders 12 and 13) to transmit the high frequency signal to one end of a feeding portion 15. The feeding portion 15 is an antenna feeding portion of a transmitting and receiving circuit disposed in the lower case 2. The other end of the feeding portion 15 is grounded in the ground plate 6.

In the portable radio device constructed as described above, an operation of an antenna when radio frequency is set to, for instance, 900 MHz (wavelength is about 333 mm) is described below as an example.

In the high frequency switch 14, when an A side terminal is selected, the plate shaped conductor 4 is selected. In this case, the plate shaped conductor 4 and the ground plate 6 operate as, for instance, a dipole antenna of half-wavelength. Further, when the high frequency switch 14 selects a B side terminal, the plate shaped conductor 5 and the ground plate 6 likewise operate as, for instance, a dipole antenna of, about half-wavelength. Accordingly, the plate shaped conductors 4 and 5 and the ground plate 6 operate as the dipole antenna provided in the upper case 1 and the lower case 2 of the portable radio device.

The antenna current of the dipole antenna constructed as described above is distributed over a wide range from the upper ends of the plate shaped conductors 4 and 5 and the lower end of the ground plate 6. Accordingly, for instance, when the user holds only the lower case 2 by the hand, or when the user holds only the hinge portion 3 by the hand, the deterioration of an antenna gain is suppressed to a minimum. This arises because of a reason why the antenna current is distributed throughout a wide range from the upper end of the upper case 1 to the lower end of the lower case 2. Thus, even when the antenna current of a specific part is influenced by the hand, the influence given to the operation of all the antenna is low.

Figure 2A:
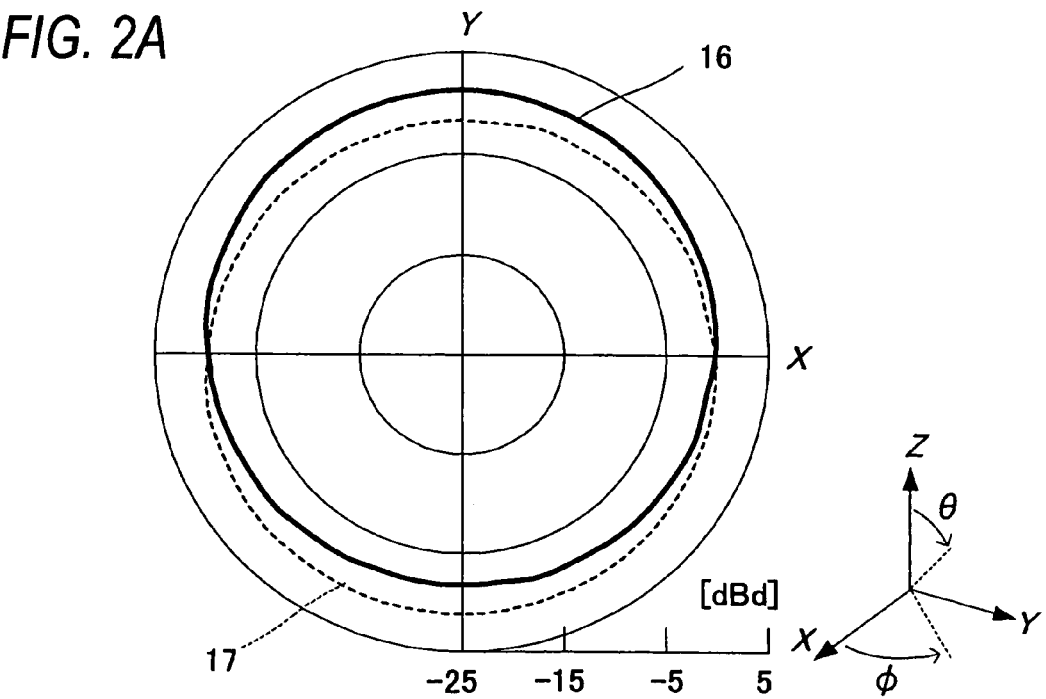
FIGS. 2A and 2B are diagrams showing the directivity of an antenna of the portable radio device according to the first embodiment.
Figure 2B:
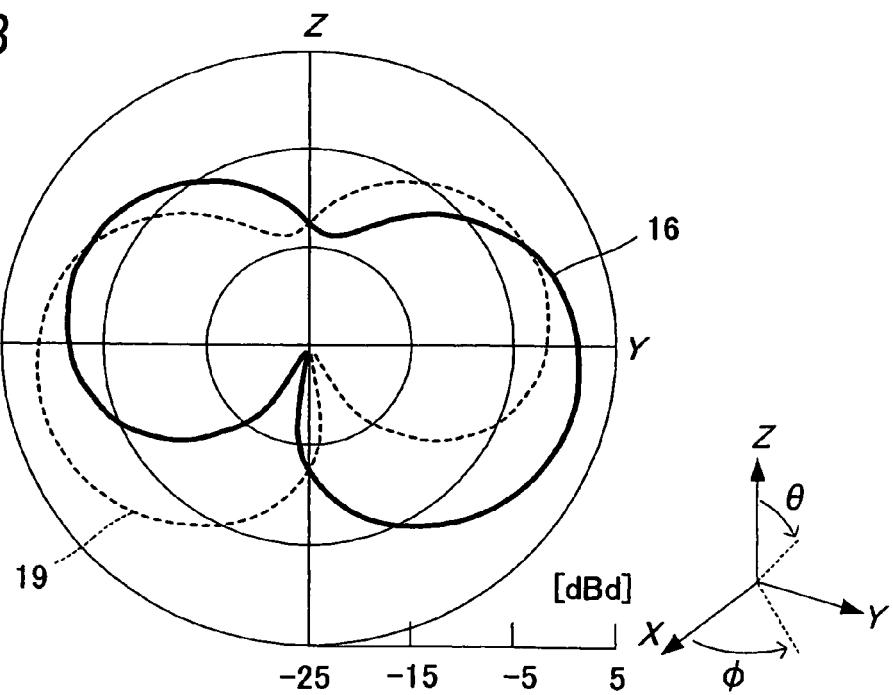

FIGS. 2A and 2B are diagrams showing the directivity of the dipole antenna shown in FIG. 1. In FIG. 2A, the directivity 16 and the directivity 17 respectively show the directivities of Eθ (vertically polarized wave) components on an XY plane. Further, in FIG. 2B, the directivity 18 and the directivity 19 respectively show the directivities of Eθ components on a YZ plane.

Further, the directivity 16 and the directivity 18 show the directivities of a state that the A side of the high frequency switch 14 in FIG. 1 is selected, that is, the plate shaped conductor 4 is selected. Further, the directivity 17 and the directivity 19 show the directivities of a state that the B side of the high frequency switch 14 is selected, that is, the plate shaped conductor 5 is selected.

As apparent from FIGS. 2A and 2B, when the plate shaped conductor 4 is selected, a gain in the direction of Y is high. When the plate shaped conductor 5 is selected, the gain in the direction of −Y is high. As described above, when the plate shaped conductor 4 or the plate shaped conductor 5 having a higher gain is automatically selected by the high frequency switch 14, a directional diversity effect can be obtained.

Figure 3A:
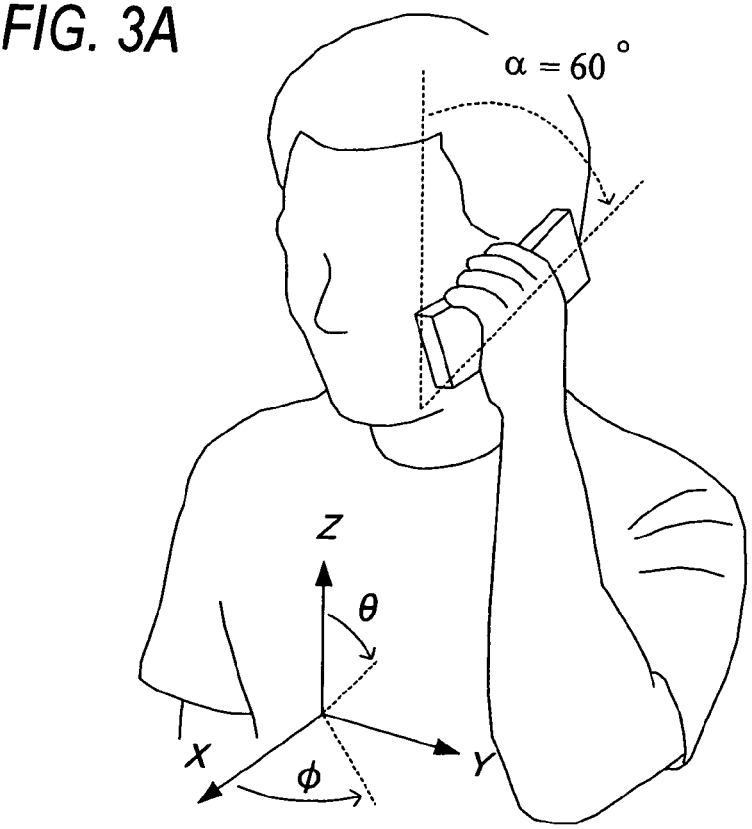
FIGS. 3A and 3B are explanatory views for explaining using states of the portable radio device according to the first embodiment.
Figure 3B:

Now, the antenna gain under a state that the portable radio device in a speaking state will be described below. FIGS. 3A and 3B are diagrams showing speaking states that the user holds the portable radio device by a left hand or a right hand to allow the device to come near to the ear or the mouth for speaking. As shown in FIGS. 3A and 3B, under the speaking state, the portably radio device is frequently inclined by about 60 degrees from a direction of Z. Further, the hand by which the user holds the portable radio device cannot be frequently limited to the left hand or the right hand. Accordingly, under both the states shown in FIGS. 3A and 3B, the high antenna gain is required for the portable radio device.

In a land mobile telecommunication system like a portable telephone system, it has been know that a radio wave coming to the portable radio device from a radio base station has an elevation angle θ of 90 degrees in coordinate systems shown in FIGS. 3A and 3B, that is, the radio wave is concentrated in the direction of a horizontal plane (XY plane). Accordingly, the high antenna gain in the direction of the horizontal plane is required for the antenna for the portable radio device under both the states shown in FIGS. 3A and 3B.

Figure 4A:
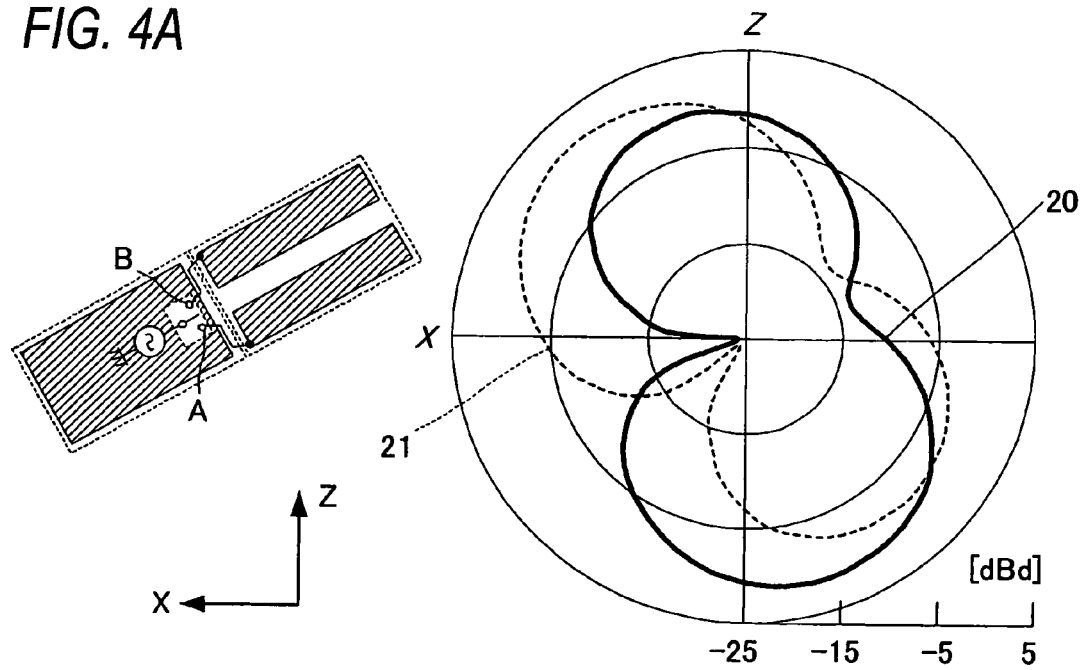
FIGS. 4A and 4B are diagrams showing the directivity of the antenna under a state in which the portable radio device according to the first embodiment is inclined by 60 degrees.
Figure 4B:
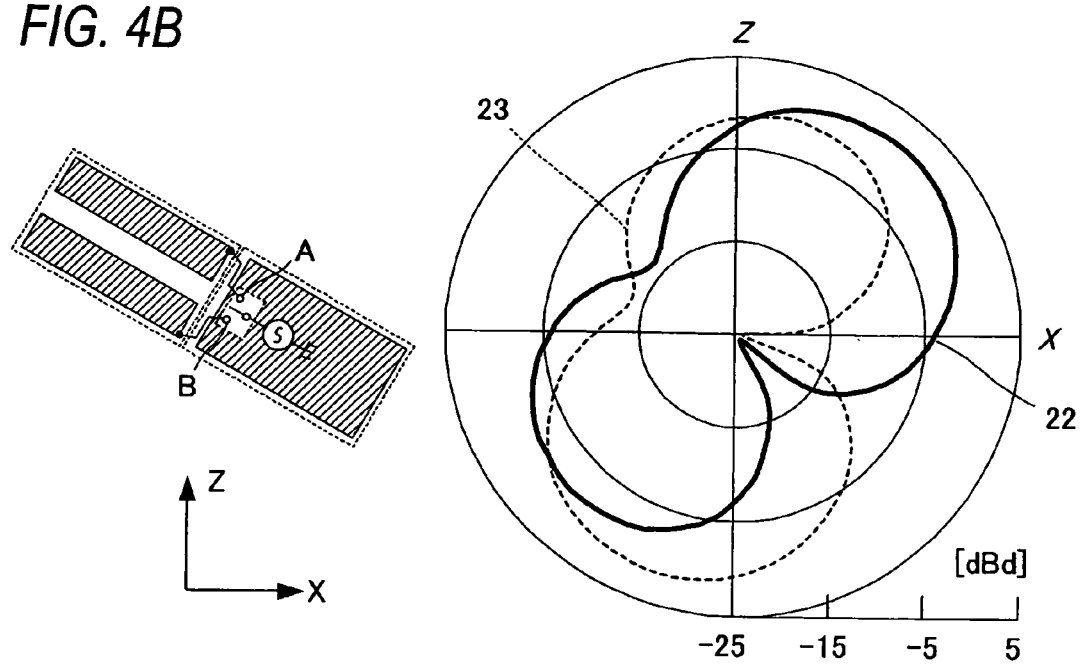

FIGS. 4A and 4B respectively show directivities on an XZ plane under a state that the portable radio device shown in FIG. 1 is disposed to be inclined by 60 degrees, that is, when the portable radio device is located in the speaking states shown in FIGS. 3A and 3B. Coordinate systems shown in FIGS. 4A and 4B respectively correspond to the coordinate systems shown in FIGS. 3a and 3B.

In FIG. 4A, the directivity 20 and the directivity 21 respectively show the directivities of Eθ (vertically polarized wave) components on the XZ plane when the portable radio device is held by the left hand. Further, in FIG. 4B, the directivity 22 and the directivity 23 respectively show the directivities of Eθ (vertically polarized wave) components on the XZ plane when the portable radio device is held by the right hand.

Further, the directivity 20 and the directivity 22 show the directivities of a state that the A side of the high frequency switch 14 in FIG. 1 is selected, that is, the plate shaped conductor 4 is selected. Further, the directivity 21 and the directivity 23 show the directivities of a state that the B side of the high frequency switch 14 is selected, that is, the plate shaped conductor 5 is selected.

As apparent from FIGS. 4A and 4B, when the portable radio device is held by the left hand, the directivity 21 of the state that the plate shaped conductor 5 is selected has a higher gain on the XZ plane. Further, when the portable radio device is held by the right hand, the directivity 22 of the state that the plate shaped conductor 4 is selected has a higher gain on the XZ plane.

As described above, when the right hand and the left hand respectively hold the portable radio device, the different plate shaped conductors 4 and 5 respectively have higher gains. In this embodiment, this phenomenon is employed to provide, for instance, a detecting unit, which is not shown in the drawings, for automatically detecting the directions of the cases 1 and 2, that is, whether the portable radio device is held by the right hand or the left hand. A switching unit is provided for automatically switching the high frequency switch 14 shown in FIG. 1 to the higher gain in accordance with the directions of the cases 1 and 2 detected by the detecting unit. Thus, the high antenna gain can be obtained in any of the speaking states that the portable radio device is held by the left hand or the right hand. Further, a measuring unit for measuring the respective gains of the plate shaped conductors 4 and 5 and a switching unit for automatically switching the switch to the higher gain on the basis of the gains measured by the measuring unit may be provided, so that the high antenna gain can be obtained in any of the speaking states that the portable radio device is held by the left hand or the right hand.

In this embodiment, the two plate shaped conductors are incorporated in the upper case 1 to switch them. However, a single plate shaped conductor may be provided in the upper case. Also in this case, the antenna gain in a speaking state can be improved.

The form of the plate shaped conductor contained in the upper case 1 is not limited to the form shown in this embodiment. A structure operating together with the ground plate contained in the lower case 2 as a dipole antenna of, for instance, about half-wavelength may obtain the same effects.

The plate shaped conductors contained in the upper case 1 may be respectively formed with a conductor for supporting, for instance, a liquid crystal display in view of a mechanism, or the plate shaped conductor may be respectively formed with a conductor thin film stuck to the surface of a resin of the upper case 1 or a conductor thin film embedded in the resin.

Further, in order to reduce an influence that the portable radio device is allowed to come near to the head part of a user, particularly to the ear under a speaking state, the plate shaped conductors incorporated in the upper case 1 are desirably arranged at positions-separate from the surface of the upper case on which the speaker 7 is disposed, that is, at positions near a surface opposed to the surface on which the speaker 7 is disposed as much as possible.

Second Embodiment

Figure 5:
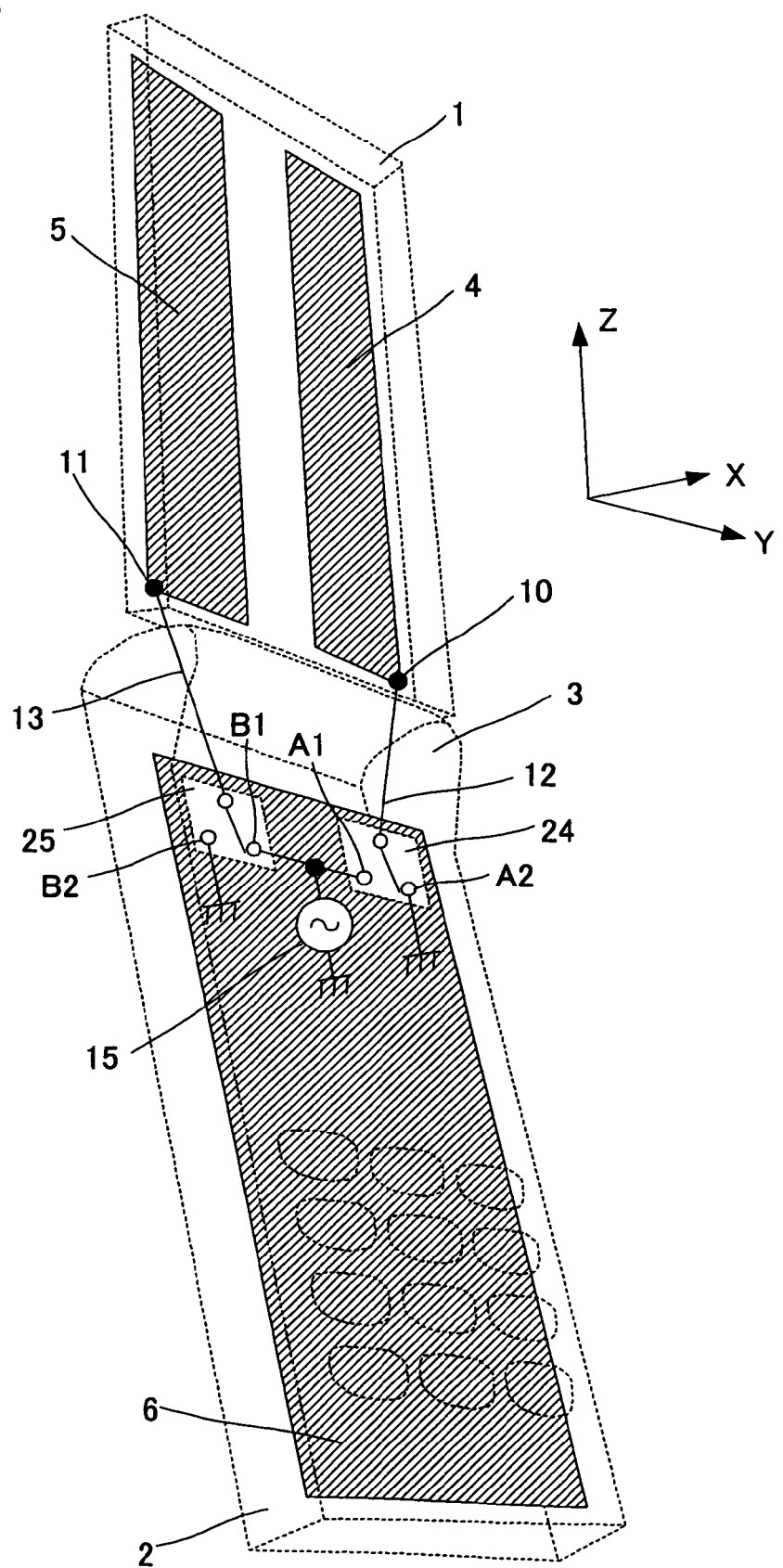
FIG. 5 is a schematic structural diagram of a portable radio device in a second embodiment of the present invention.

FIG. 5 is a schematic structural diagram of a portable radio device in a second embodiment of the present invention. The portable radio device in this embodiment is also a portable radio device having a foldable or collapsible structure. In FIG. 5, an opened state (refer this state to as an opening state, hereinafter) is shown. In FIG. 5, duplicated portions of FIG. 1 are designated by the same reference numerals.

In the portable radio device shown in FIG. 5, the plate shaped conductor 4 or the plate shaped conductor 5 that is not selected is grounded in a ground plate 6.

In FIG. 5, feeders 12 and 13 are respectively connected to high frequency switches 24 and 25. The high frequency switch 24 performs an operation for switching whether an electric signal of the feeder 12 is transmitted to a feeding portion 15 or grounded to the ground plate 6. Further, the high frequency switch 25 performs an operation for switching whether an electric signal of the feeder 13 is transmitted to the feeding portion 15 or grounded in the ground plate 6.

Here, for instance, when a terminal B1 side of the high frequency switch 25 is selected and the plate shaped conductor 5 is connected to the feeding portion 15, a terminal A2 side of the high frequency switch 24 is selected and the plate shaped conductor 4 is grounded in the ground plate 6. On the contrary, when a terminal A1 side of the high frequency switch 24 is selected and the plate shaped conductor 4 is connected to the feeding portion 15, a terminal B2 side of the high frequency switch 25 is selected and the plate shaped conductor 5 is grounded in the ground plate 6.

Figure 6A:
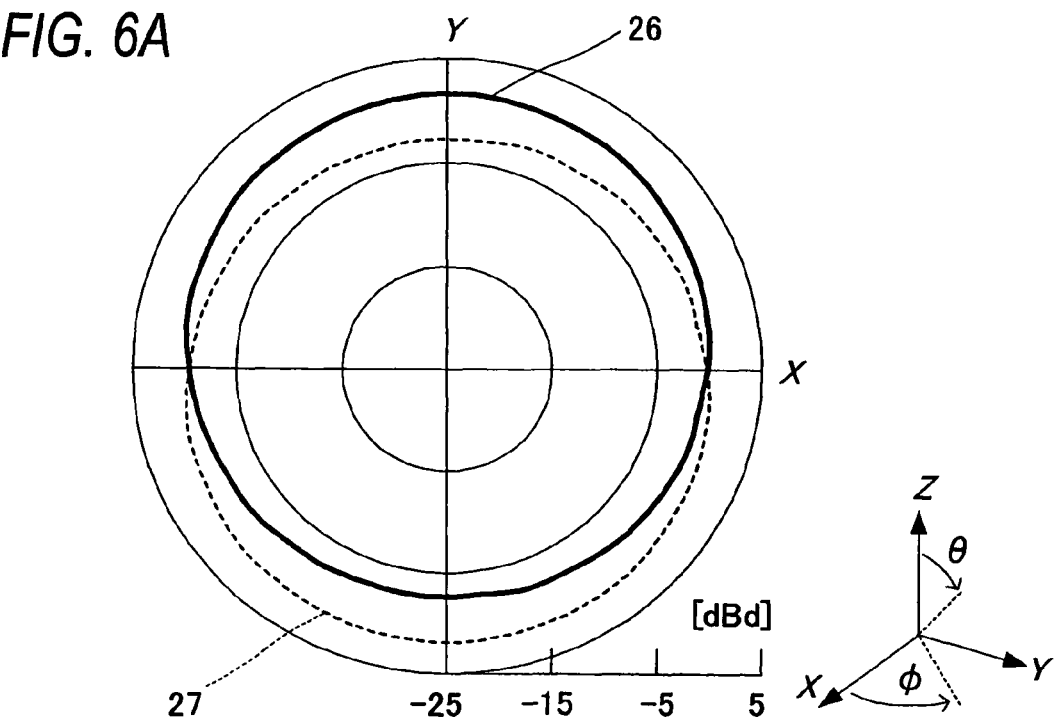
FIGS. 6A and 6B are diagrams showing the directivity of an antenna of the portable radio device according to the second embodiment.
Figure 6B:
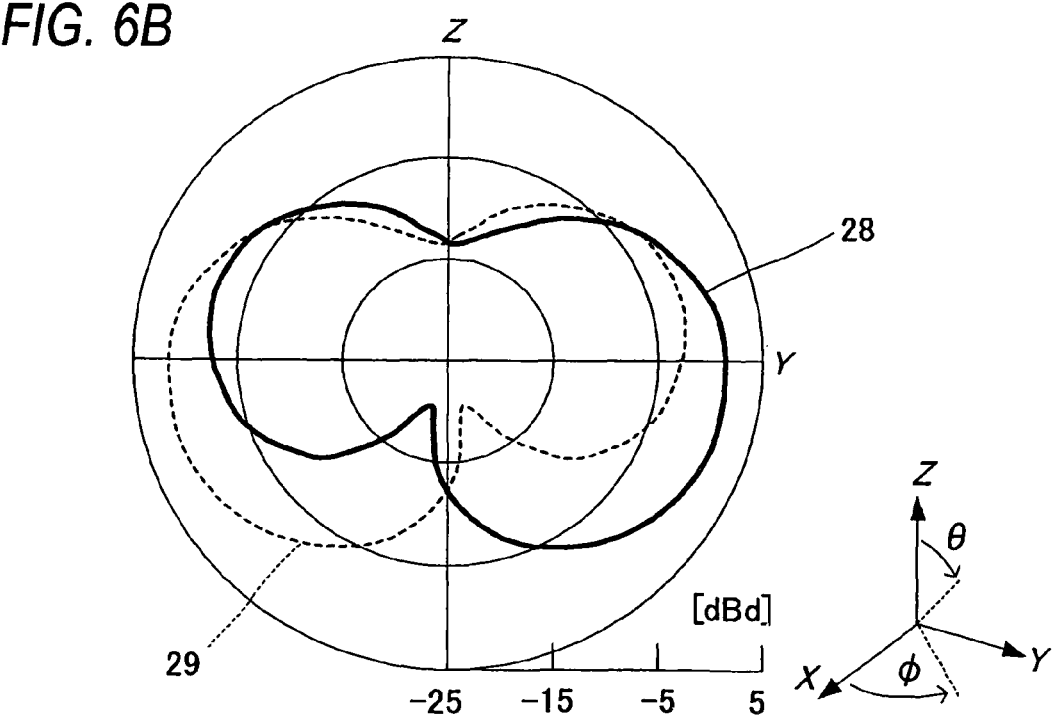

FIGS. 6A and 6B show directivities when the high frequency switches are operated as described above. In FIG. 6A, the directivity 26 and the directivity 27 respectively show the directivities of Eθ (vertically polarized wave) components on an XY plane. In FIG. 6B, the directivity 28 and the directivity 29 respectively show the directivities of Eθ components on a YZ plane.

Further, the directivity 26 and the directivity 28 show the directivities of a state that the terminal A1 side of the high frequency switch 24 and the terminal B2 side of the high frequency switch 25 in FIG. 5 are selected, that is, the directivities of a state that an electric current is supplied to the plate shaped conductor 4 and the plate shaped conductor 5 is grounded in the ground plate 6. Further, the directivity 27 and the directivity 29 show the directivities of a state that an electric current is supplied to the plate shaped conductor 5 and the plate shaped conductor 4 is grounded in the ground plate 6.

As apparent from FIGS. 6A and 6B, when the plate shaped conductor 4 is turned on, a gain in the direction of Y is high. When the plate shaped conductor 5 is turned on, the gain in the direction of −Y is high. This tendency is the same as the tendency shown in FIG. 2. However, an amount of variation of a maximum gain in FIG. 6 is apparently higher than that of FIG. 2. This arises because of a reason why the plate shaped conductor that is not turned on is grounded in the ground plate 6 so that these members operate as a reflecting element. As described above, a directional diversity effect obtained by the structure shown in FIG. 5 is higher than that obtained by the structure shown in FIG. 1.

The structures of the high frequency switch 24 and the high frequency switch 25 are not limited to the structure shown in this embodiment. Any of structures that can switch whether the plate shaped conductor is turned on or grounded in the ground plate may obtain the same effects.

Third Embodiment

Figure 7:
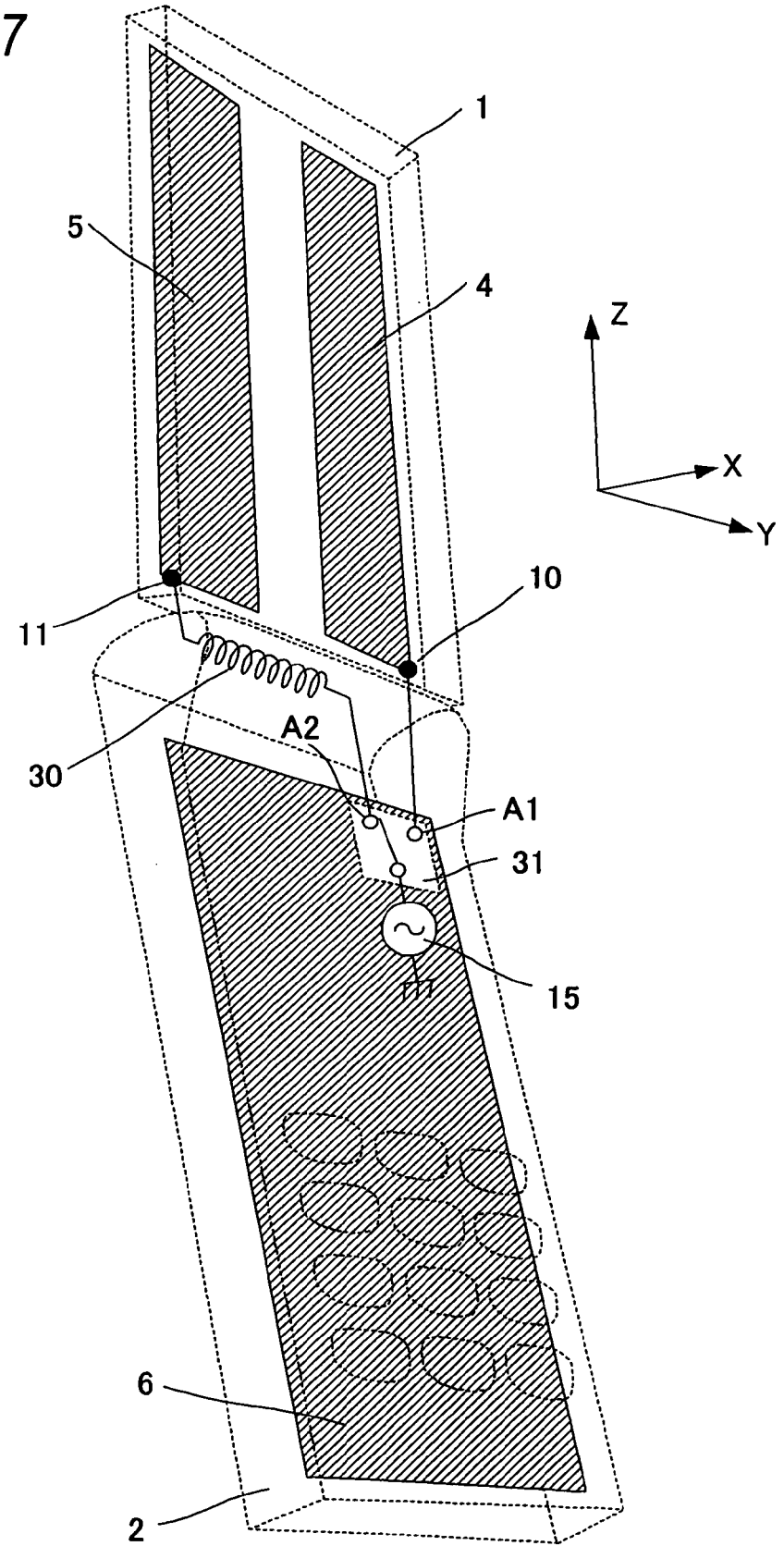
FIG. 7 is a schematic structural diagram of a portable radio device in a third embodiment of the present invention.

FIG. 7 is a schematic structural diagram of a portable radio device according to a third embodiment of the present invention. The portable radio device in this embodiment is also a portable radio device having a foldable or collapsible structure. In FIG. 7, an opened state (refer this state to as an opening state, hereinafter) is shown. In FIG. 7, the duplicated portions of FIG. 1 are designated by the same reference numerals.

In FIG. 7, a helical element 30 is inserted between a plate shaped conductor 5 and a high frequency switch 31.

In FIG. 7, the helical element 30 is formed by winding a conductor in a coil shape. The electric length thereof is preferably set to substantially half-wavelength in an operating frequency (for instance, 900 MHz). In this case, the helical element 30 is inserted between the plate shaped conductor 5 and the high frequency switch 31, so that a phase for exciting the plate shaped conductor 5 is inverted.

Figure 8:
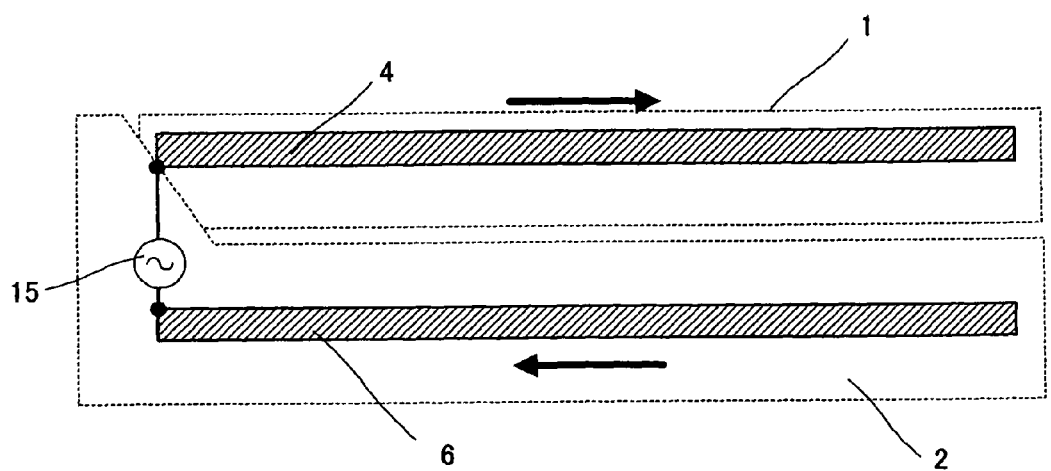
FIG. 8 is an explanatory view showing the operation of a closing state (first) of the portable radio device according to the third embodiment.
Figure 9:
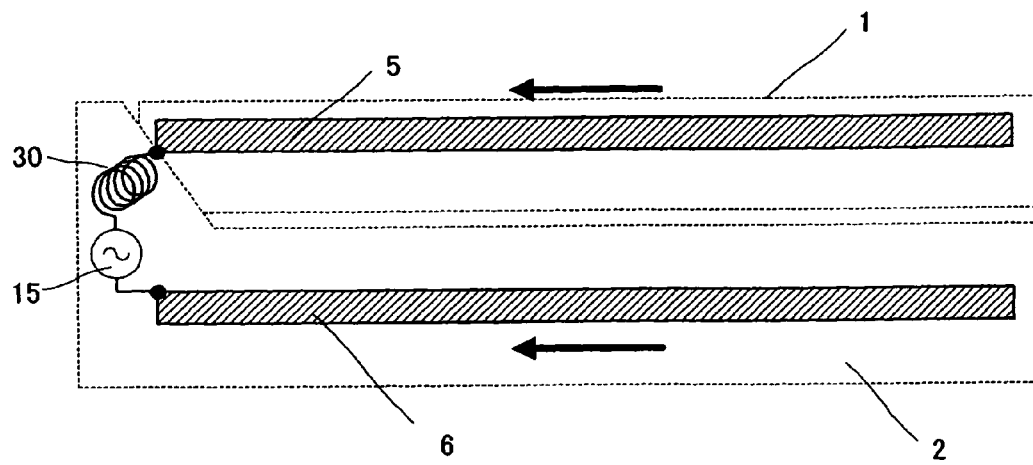
FIG. 9 is an explanatory view showing the operation of a closing state (second) of the portable radio device according to the third embodiment.

FIGS. 8 and 9 are side views of the portable radio device shown in FIG. 7 and show states that an upper case 1 and a lower case 2 are closed (refer this state to as a closing state, hereinafter). FIG. 8 shows a state that a terminal A1 side of the high frequency switch 31 shown in FIG. 7 is selected, that is, a plate shaped conductor 4 is selected. FIG. 9 shows a state that a terminal A2 side of the high frequency switch 31 shown in FIG. 7 is selected, that is, the plate shaped conductor 5 is selected.

In the state shown in FIG. 8, the phases of antenna currents distributed in the plate shaped conductor 4 and a ground plate 6 are shown by arrow marks. Accordingly, the antenna currents on the plate shaped conductor 4 and the ground plate 6 are respectively cancelled to each other so that a radiation resistance is extremely lowered. Thus, the radiation efficiency of an antenna is lowered to increase a loss in non-matching of impedance. As a result, an antenna gain of this state is decreased to reduce a bandwidth.

As compared therewith, in the state that the terminal A2 side of the high frequency switch 31 as shown in FIG. 9 is selected, that is, in the state that the helical element 30 and the plate shaped conductor 5 are selected, the phases of antenna currents distributed on the plate shaped conductor 5 and the ground plate 6 correspond to each other.

Figure 10A:
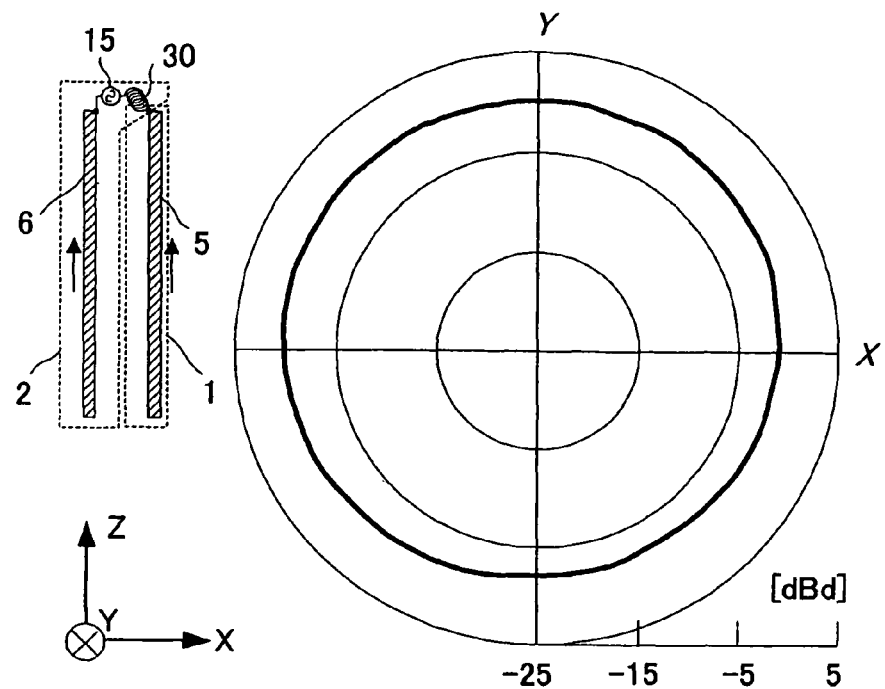
FIGS. 10A and 10B are diagrams showing the directivity of an antenna of the portable radio device according to the third embodiment.
Figure 10B:
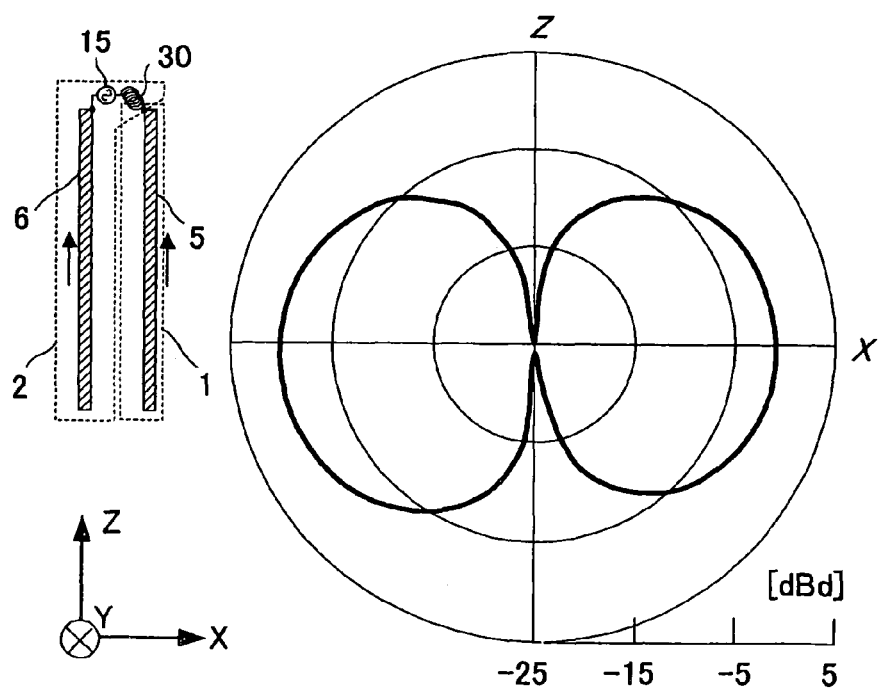

FIGS. 10A and 10B show the directivities of Eθ components of the state shown in FIG. 9 on an XY plane and an XZ plane. As apparent from FIG. 10A and FIG. 10B, the Eθ components substantially have no directivities on a horizontal plane (XY plane) and have 8-shaped directivities on the XZ plane. Under this state, a high antenna gain and a wide bandwidth can be assured.

In such a way, when the portable radio device is in the opening state, the high frequency switch 31 is switched to the terminal A1 side. When the portable radio device is in the closing state, the high frequency switch 31 is switched to the terminal A2 side. Thus, an antenna performance can be obtained in both the states.

Any of the helical elements 30 whose electric length has substantially half-wavelength may have the same effects. For instance, a meander pattern printed on a printed circuit board or an insulator may be employed. Further, the helical element 30 may be formed with a meander conductor as a part of the plate shaped conductor 5.

Fourth Embodiment

Figure 11:
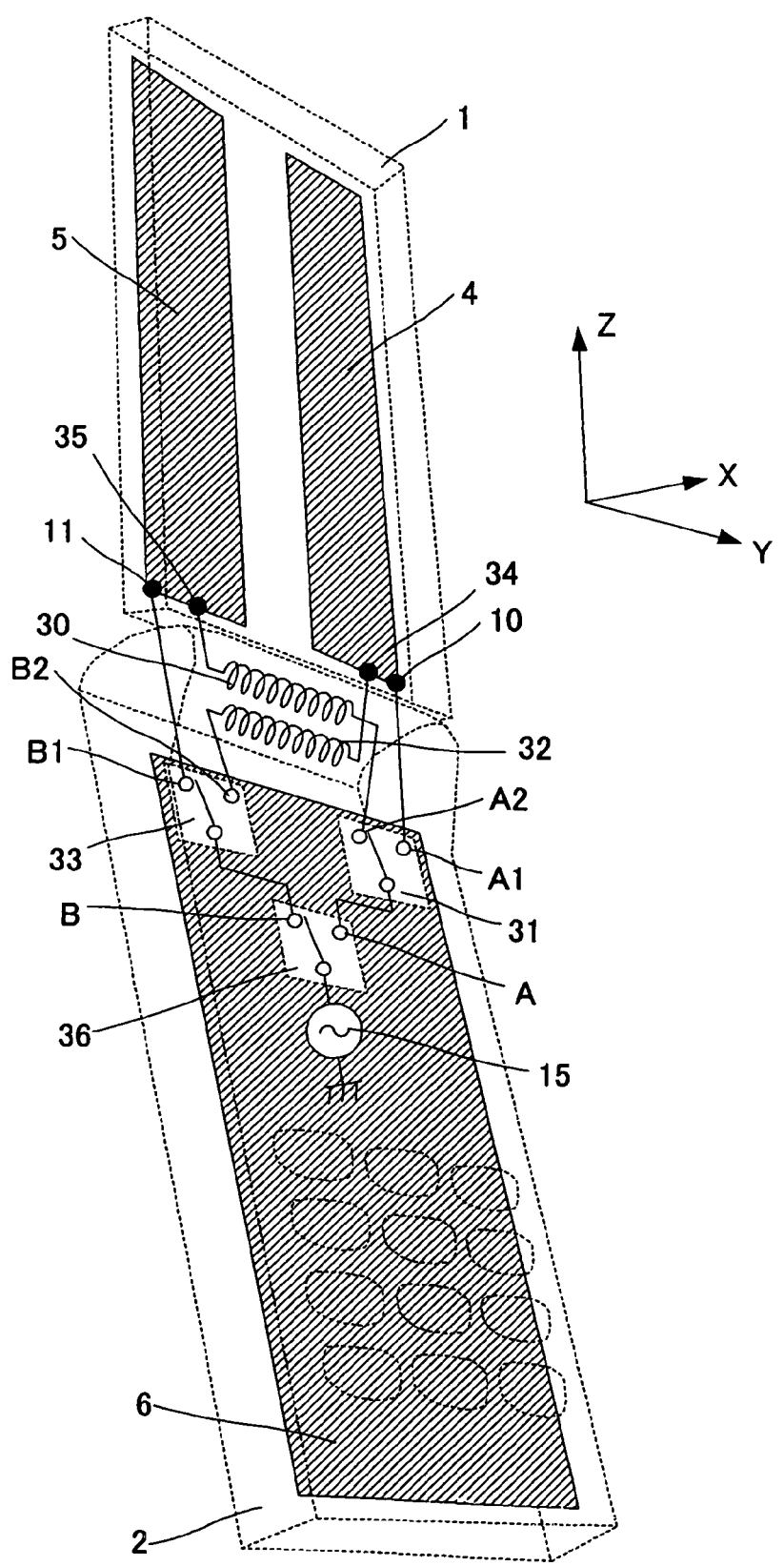
FIG. 11 is a schematic structural diagram of a portable radio device in a fourth embodiment of the present invention.

FIG. 11 is a schematic structural diagram of a portable radio device in a fourth embodiment of the present invention. The portable radio device of this embodiment is also a portable radio device having a foldable or collapsible structure. FIG. 11 shows an opened state (refer this state to as an opening state, hereinafter). In FIG. 11, duplicated portions to those of FIG. 7 are designated by the same reference numerals.

In the portable radio device shown in FIG. 11, a helical element 32 is inserted between a feeding point 34 of a plate shaped conductor 4 and a high frequency switch 33 and a feeding point 11 of a plate shaped conductor 5 is connected to the high frequency switch 33.

In FIG. 11, the helical element 32 has the same electric characteristics as those of a helical element 30. A high frequency switch 31 and the high frequency switch 33 are selected by a high frequency switch 36 to supply electric current to a feeding portion 15.

In the above-described structure, under a state that a terminal A1 side of the high frequency switch 31 and a terminal B1 side of the high frequency switch 33 are selected, the plate shaped conductor 4 or the plate shaped conductor 5 and a ground plate 6 operate as a dipole antenna having the same structure shown in FIG. 1 which is formed by the plate shaped conductor 4 or the plate shaped conductor 5 and the ground plate 6. In the opening state, this state is desirably selected. In that case, a high antenna gain can be obtained. Then, at this time, the plate shaped conductor 4 or the plate shaped conductor 5 is selected by the high frequency switch 36 so that a directional diversity effect is obtained.

Then, under a closing state, a terminal A2 side of the high frequency switch 31 and a B2 side of the high frequency switch 33 are desirably selected. In this state, an antenna operation similar to that of the structure shown in FIG. 9 is achieved so that the high antenna gain can be obtained under the closing state. At this time, the plate shaped conductor 4 or the plate shaped conductor 5 is selected by the high frequency switch 36 so that a directional diversity effect under the closing state can be obtained.

Fifth Embodiment

Figure 12:
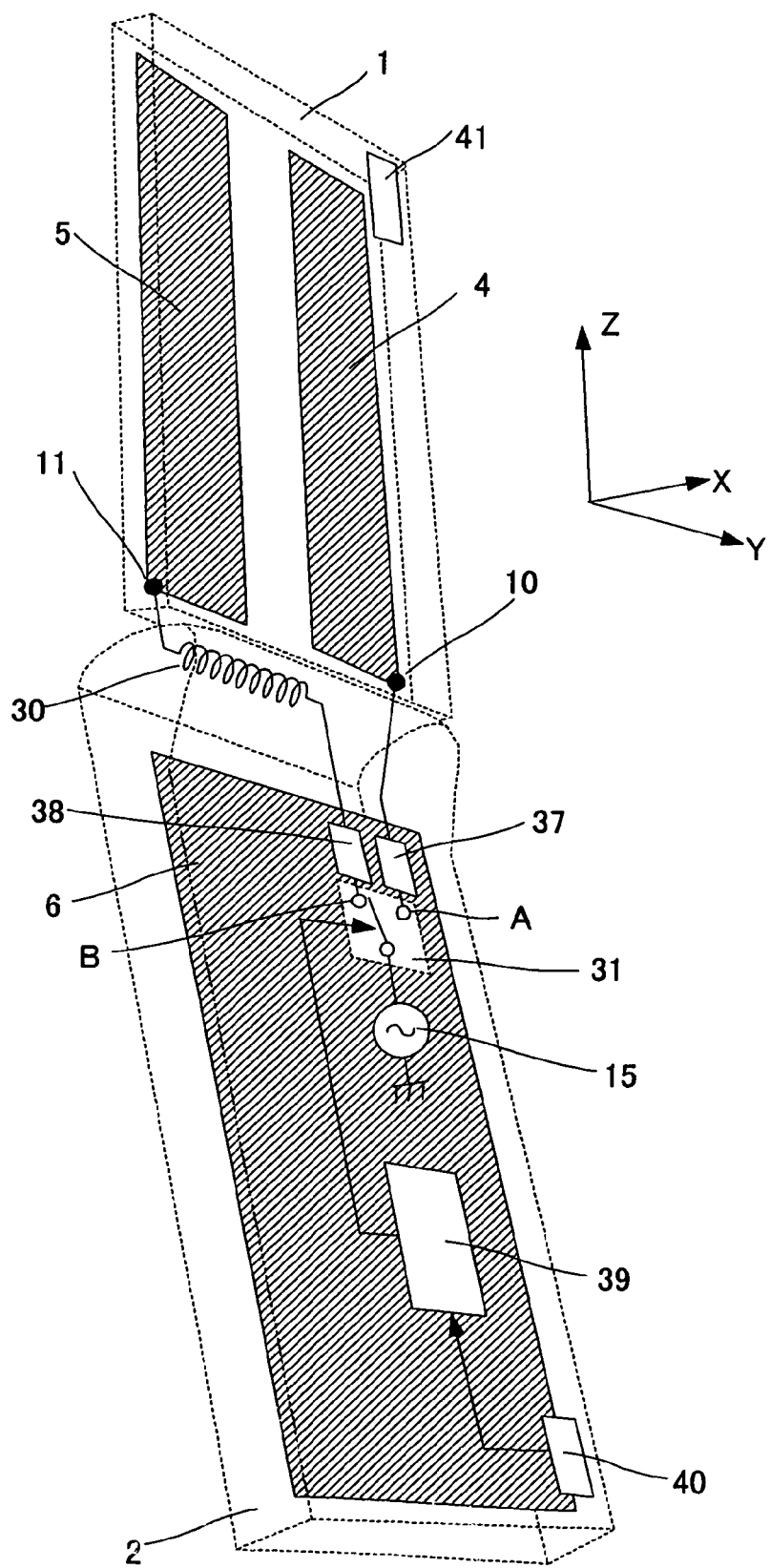
FIG. 12 is a schematic structural diagram of a portable radio device in a fifth embodiment of the present invention.

FIG. 12 is a schematic structural diagram of a portable radio device in a fourth embodiment of the present invention. The portable radio device of this embodiment is also a portable radio device having a foldable or collapsible structure. FIG. 12 shows an opened state (refer this state to as an opening state, hereinafter). In FIG. 12, duplicated portions to those of FIG. 7 are designated by the same reference numerals.

In the portable radio device shown in FIG. 12, a matching circuit 37 and a matching circuit 38 are provided. When a plate shaped conductor 4 is selected in the opening state, or when a plate shaped conductor 5 is selected in a closing state, a suitable impedance matching is performed for both the cases.

Further, in the portable radio device shown in FIG. 12, a control portion 39, a magnet switch 40 and a permanent magnet 41 are added to detect the opening state or the closing state of the portable radio device and switch a high frequency switch 31 in accordance therewith.

In FIG. 12, the matching circuit 37 and the matching circuit 38 are formed with, for instance, concentrated constant elements such as inductance and condensers. The matching circuit 37 operates so that the impedance of a dipole antenna formed by the plate shaped conductor 4 in the opening state and a ground plate 6 is matched with the impedance (ordinarily, 50Ω) of a feeding portion 15. Further, the matching circuit 38 operates so that the impedance of an antenna formed by the plate shaped conductor 5 in the closing state, a helical element 30 and the ground plate 6 is matched with the impedance of the feeding portion 15.

As described above, the suitable matching circuits are provided respectively for the plate shaped conductors or the opening and closing states. Thus, an antenna performance for each of the states is more improved.

Then, for instance, in the closing state, since the magnet switch 40 comes near to the permanent magnet 41, the magnet switch 40 is turned ON. The control portion 39 detects this state and operates to switch the high frequency switch 31 to a terminal B side. On the other hand, in the opening state, the magnet switch 40 is turned OFF to switch the high frequency switch 31 to a terminal A side.

In such a way, suitable antenna states are selected in accordance with the detected results of the opening and closing states, so that a high antenna gain can be obtained for both the states.

The matching circuit is not limited to a circuit composed of the concentrated constant elements and may be formed by, for instance, a plane circuit disposed on a printed circuit board. Further, means for detecting the opening and closing states is not limited to the magnet switch and the permanent magnet. For instance, means for detecting an operation of a mechanism of a hinge portion may be employed, or means interlocking with an operating state such as a speaking mode or a waiting mode of the portable radio device may be employed.

Sixth Embodiment

Figure 13:
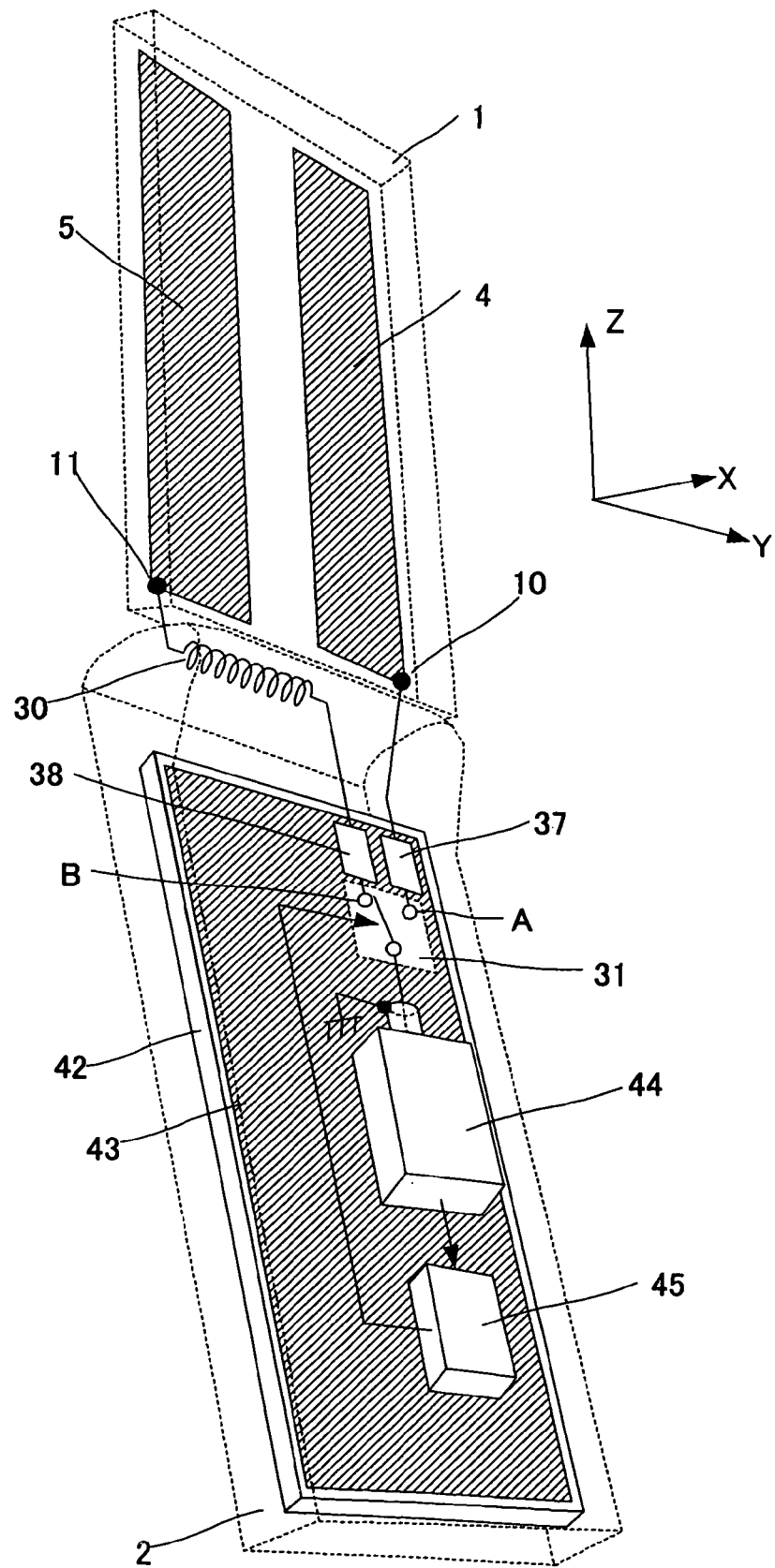
FIG. 13 is a schematic structural diagram of a portable radio device in a sixth embodiment of the present invention.

FIG. 13 is a schematic structural diagram of a portable radio device in a sixth embodiment of the present invention. The portable radio device of this embodiment is also a portable radio device having a foldable or collapsible structure. FIG. 13 shows an opened state (refer this state to as an opening state, hereinafter). In FIG. 13, duplicated portions to those of FIG. 7 or FIG. 12 are designated by the same reference numerals.

In the portable radio device shown in FIG. 13, the ground plate 6 in the portable radio device shown in FIG. 7 is formed with a ground pattern 43 on a printed circuit board 42. A radio circuit portion 44 and a level deciding portion 45 mounted on the printed circuit board 42 are added.

In FIG. 13, as the printed circuit board 42, for instance, a glass epoxy base having the thickness of about 1 mm is used. The ground pattern 43 is formed with a silver foil pattern printed on the surface or the inner layer of the printed circuit board 42. The ground pattern 43 functions as an antenna in the same manner as that of the ground plate 6 in FIG. 7. Such a structure is provided so that the ground plate operating as the antenna does not need to be overlaid on the printed circuit board 42 as an originally necessary component. Thus, the decrease of thickness of a lower case 2 of the portable radio device can be realized.

The radio circuit portion 44 is composed of a transmitting circuit and a receiving circuit and covered with electromagnetic shielding means such as a shield case. A signal selected by a high frequency switch 31 is transmitted to the radio circuit portion 44 and the ground of the radio circuit portion 44 is grounded in the ground pattern 43. In accordance with such a structure, to an antenna formed by plate shaped conductors 4 and 5 and the ground pattern 43, electric current is fed by the radio circuit portion 44.

The level deciding portion 45 includes a function for deciding whether a receiving level obtained in the receiving circuit that forms the radio circuit portion 44 is high or low and a function for switching the high frequency switch 31 in accordance therewith. Specifically, the level determining portion 45 determines the receiving levels respectively obtained when the high frequency switch 31 is switched to a terminal A side or a terminal B side and operates to select the terminal side of a higher receiving level. For instance, when the portable radio device of this embodiment is applied to a time division multiplex connection (TDMA) system, a series of operations as described above are continuously carried out at a suitable timing. Accordingly, a high antenna gain can be always ensured.

Seventh Embodiment

Figure 14:
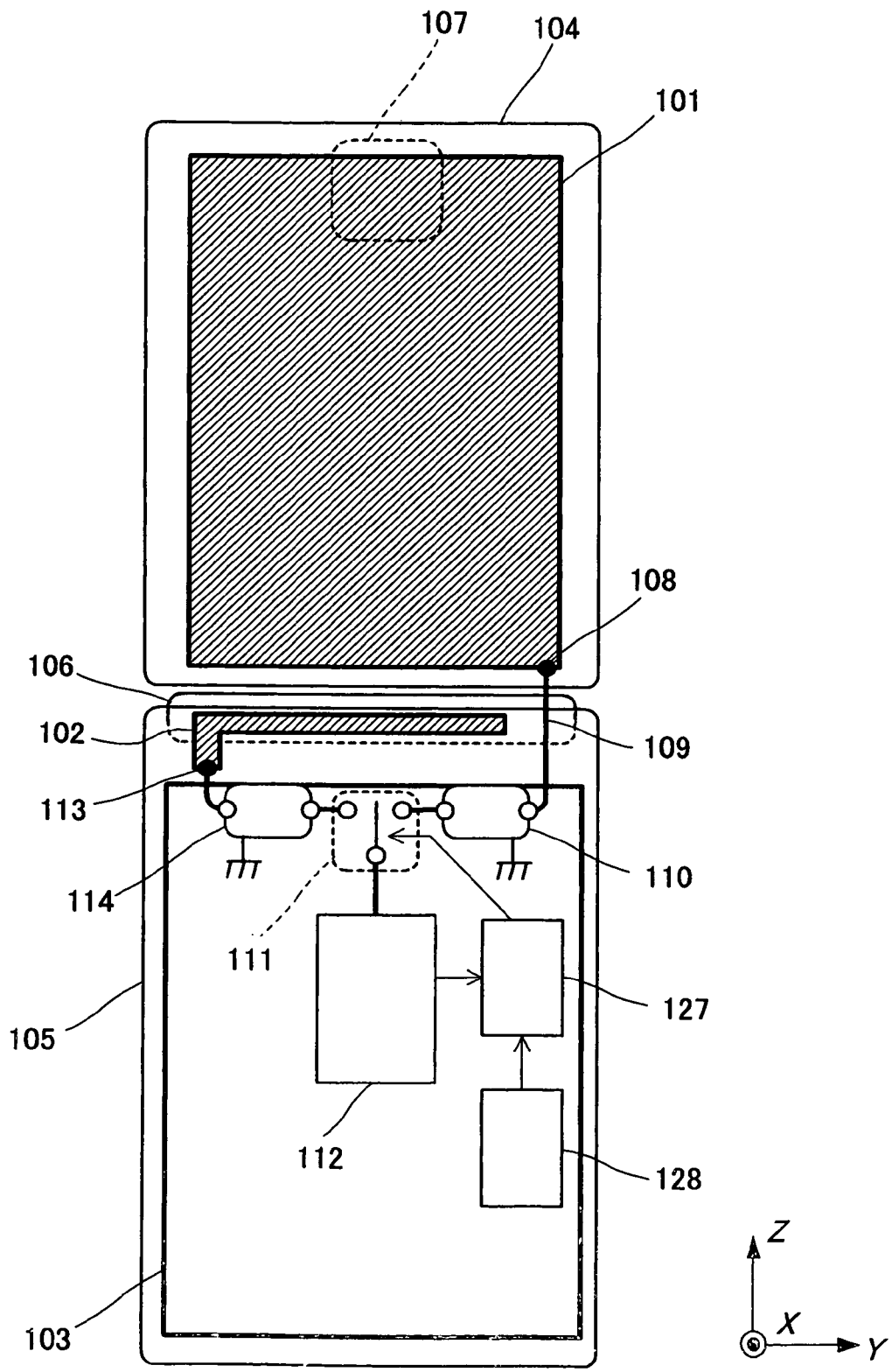
FIG. 14 is a front view showing a portable radio device in a seventh embodiment.

FIG. 14 is a front view showing a portable radio device for explaining a seventh embodiment of the present invention.

Figure 15:
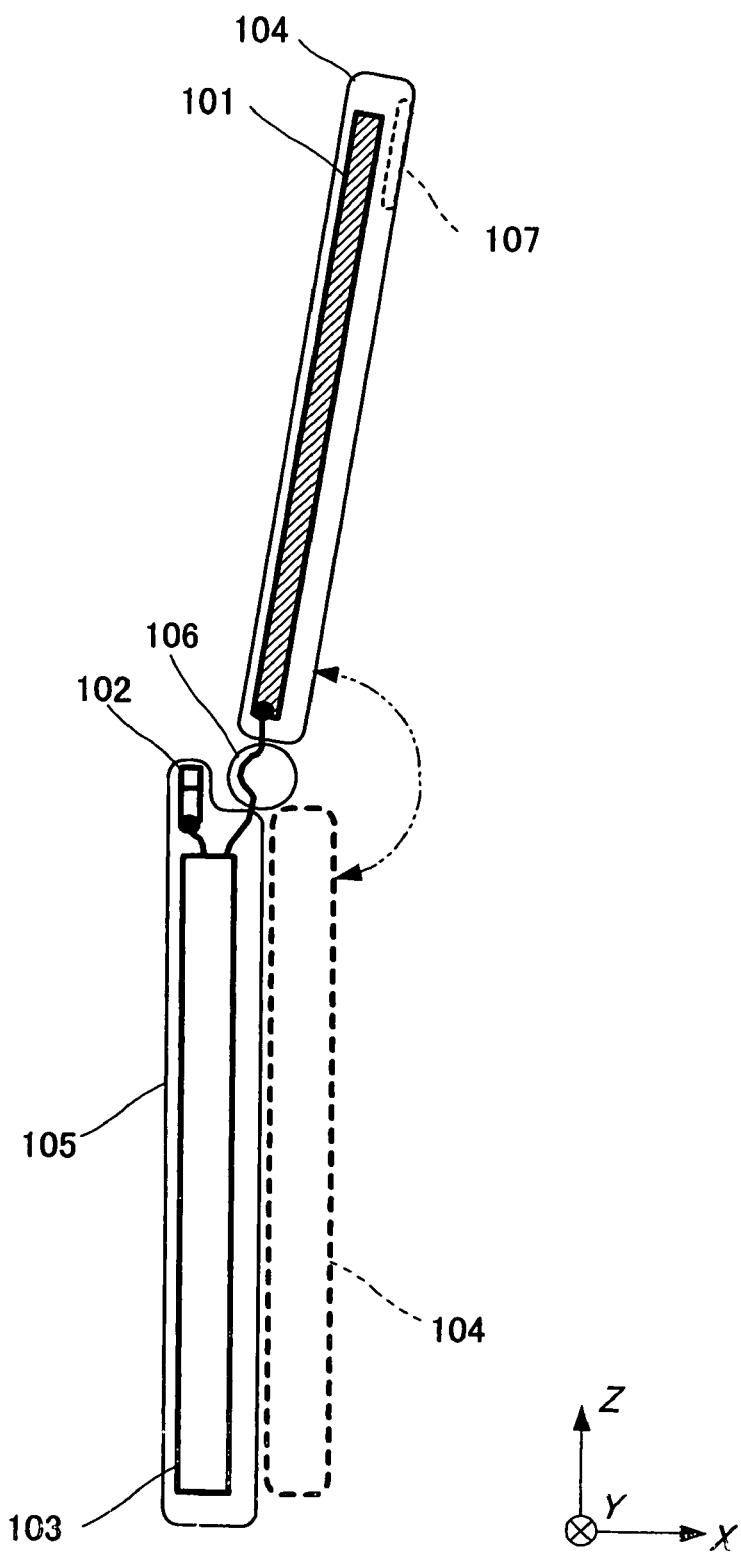
FIG. 15 is a side view showing the portable radio device of the seventh embodiment.

FIG. 15 is a side view showing the portable radio device for explaining the seventh embodiment of the present invention. As shown in these figures, the portable radio device of this embodiment is a foldable or collapsible radio device in which an upper case 104 and a lower case 105 are connected together by a hinge portion 106. The upper case and the lower case are rotated on the hinge portion 106 so that two states including an opening state and a closing state may be obtained. The upper case 104 and the lower case 105 are made of molded products of a resin as an insulator.

In the upper case 104, an antenna element 101 and a speaker 107 having a sound generating element are provided. The antenna element 101 is formed with a plate shaped conductor base. However, the antenna element 101 is not limited to the plate shaped conductor base. For instance, a ground pattern of a circuit board provided in the upper case 104 or a metallic frame for mechanically supporting the speaker 107 may be employed, or a metallic plate forming the upper case 104 itself may be employed. Further, the speaker 107 is used when a user listens to a sound upon speaking. A sound hole surface for emitting sound is directed to the direction of X in a coordinate system shown in FIG. 14. The user allows his ear to come into contact with a part near the speaker 107 on an X side surface outside the upper case 104 to speak.

Further, in the lower case 105, an antenna element 102 as an example of a second antenna element and a circuit board 103 as an example of a conductor element are provided. The antenna element 102 is an L-shaped conductor plate and a long side part thereof is arranged along a Y-axis direction in the vicinity of the hinge portion 106 in the lower case 105. The long side of the antenna element 102 has a length of about ¼ to ½ wavelength relative to a radio signal.

The circuit board 103 is a printed circuit board on which circuits for realizing a radio communication function or various kinds of other functions are mounted. A ground pattern serving as an earth potential of the circuits is formed on a substantially entire surface thereof. Further, the circuit board 103 includes a matching circuit 110 as one example of a first matching portion, a matching circuit 114 as one example of a second matching portion, a high frequency switch 111 and a switch control portion 127 as one example of a switching portion, a radio circuit portion 112 as one example of a receiving field intensity measuring portion and a signal processing portion, and an opening and closing detecting portion 128 as one example of an opening and closing detecting portion.

The matching circuit 110 serves to match the impedance of the antenna element 101 with, for instance, 50Ω and is connected to the antenna element 101 at a feeding point 108 through a feeder 109. The matching circuit 110 is arranged at a position near the right side (Y) of the circuit board 103. The feeding point 108 is arranged at a position near the right side (Y) by viewing the portable radio device from a front surface (X) side on the antenna element 101.

Further, the matching circuit 114 serves to match the impedance of the antenna element 102 with, for instance, 50Ω and is connected to the antenna element 102 at a feeding point 113 through a feeder. The matching circuit 114 is arranged at a position near the left side (−Y) on the circuit board 103, that is, a side opposed the matching circuit 110. The feeding point 113 is arranged at a position near the left side (−Y) by viewing the portable radio device from a front surface (X) side on the antenna element 102, that is. A side opposed to the feeding point 108.

The high frequency switch 111 is composed of an FET or a PIN diode or the like to select either the matching circuit 110 or the matching circuit 114 and transmit a signal received by the antenna element 101 or the antenna element 102 to the radio circuit portion 112. The radio circuit portion 112 performs a signal process to a transmitted signal or a received signal, and especially measures the receiving field intensity of the signal received by the antenna element 101 or the antenna element 102. Further, the opening and closing detecting portion 128 serves to detect the opening and closing states of the upper case 104 and the lower case 105 and is realized by for instance, a permanent magnet, a Hall element and a mechanical switch or the like.

The switch control portion 127 serves to control the high frequency switch 111 to select the antenna element having a higher receiving intensity in accordance with the detected result of the opening and closing detecting portion 128 or the receiving field intensity of each of the antenna elements 101 and 102 measured by the radio circuit portion 112. Owing to a below-described reason, the switch control portion 127 selects the antenna element 101 side under the opening state and selects the antenna element 102 side under the closing state.

An antenna operation in the portable radio device of the seventh embodiment having the above-described components will be described below. In the following description, it is assumed that radio frequency is 1.5 GHz (wavelength of 200 mm) is used.

Initially, the antenna operation under a state in which the upper case 104 and the lower case 105 are opened as shown in FIG. 14 will be described. Under this state, when the matching circuit 110 side, that is, the antenna element 101 side is selected by the high frequency switch 111, the antenna element 101 and the circuit board 103 are arranged in a straight line. Thus, these members serve as a dipole antenna of one wavelength. On the other hand, when the matching circuit 113 side, that is, the antenna element 102 side is selected, the antenna element 102 feeds unbalanced electric current to the circuit board 103 through the feeding point 113 and further operates while the antenna element 102 is electro-magnetically connected to the antenna element 101. In such a way, under the opening state, even when either of the antenna elements is selected, a high antenna performance is obtained.

Then, the antenna operation when the upper case 104 and the lower case 105 are closed is described below. Under this state, when the antenna element 101 side is selected by the high frequency switch 111, the antenna element 101 comes near to the circuit board 103. Thus, antenna currents have opposite phases to be cancelled to each other, so that an antenna performance is deteriorated. On the other hand, when the antenna element 102 side is selected by the high frequency switch 111, the antenna element 102 operates as a mono-pole antenna of ¼ wavelength for feeding unbalanced electric current to the circuit board 103 through the feeding point 113. Accordingly, the antenna performance higher than that when the antenna element 101 is selected is obtained. In such a way, under the closing state, when the antenna element 102 side is selected, a higher antenna performance can be obtained.

Figure 16:
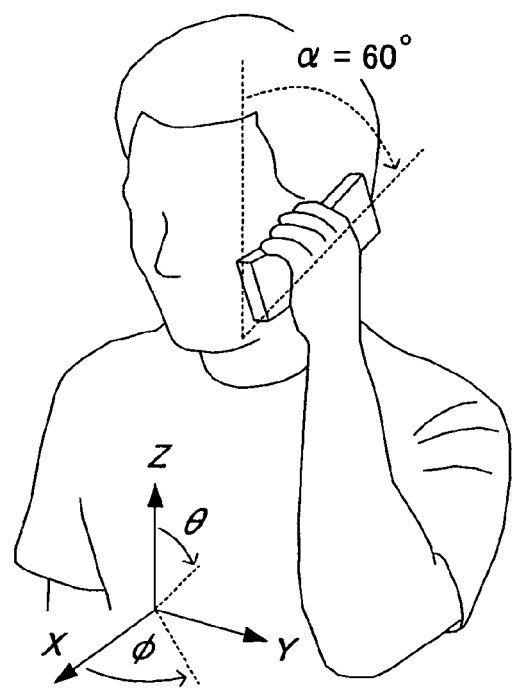
FIG. 16 is an explanatory view showing a state that the portable radio device of the seventh embodiment is held by a left hand at an inclination angle of 60 degrees.

Now, an antenna operation under a state that the user holds the portable radio device of this embodiment by a left hand to speak will be described below. FIG. 16 to FIG. 20 are explanatory views showing antenna operations and directivities when the portable radio device of this embodiment is held by a left hand (a left hand speaking state). An average inclination angle α at which the user holds the portable radio device under the speaking state is ordinarily 60 degrees. FIG. 16 is an explanatory view showing a state that the portable radio device of this embodiment is held by the left hand at the inclination angle of 60 degrees.

Figure 17:
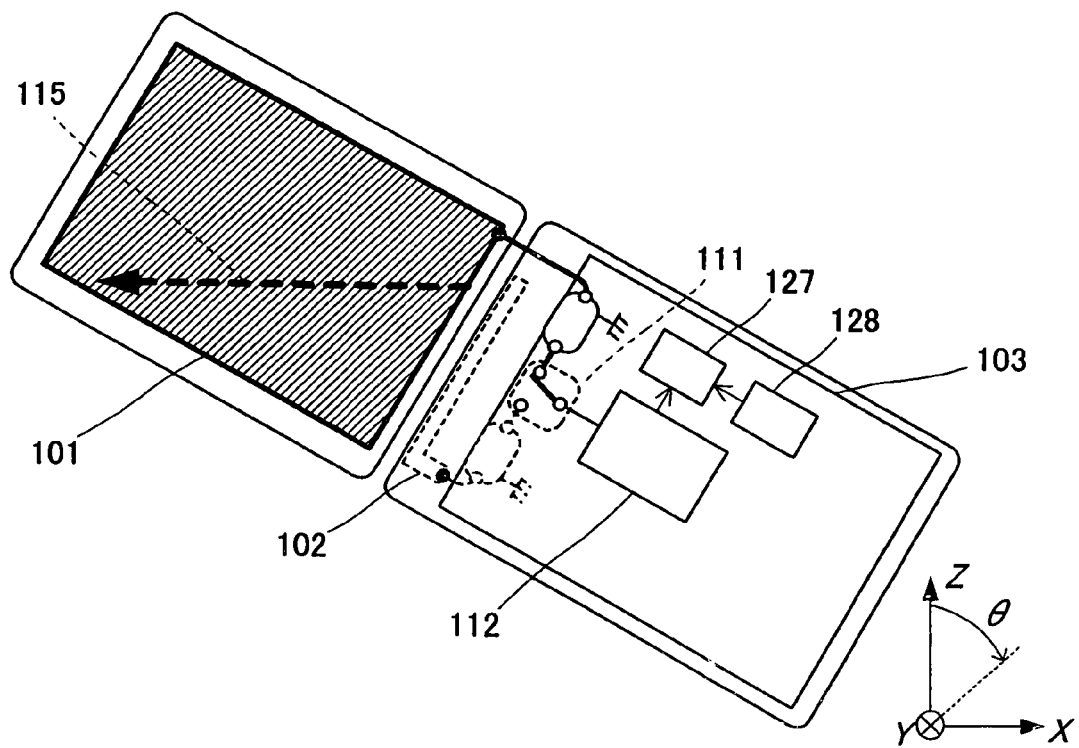
FIG. 17 is an explanatory view showing the operation of an antenna when a first antenna element is selected while the portable radio device of the seventh embodiment is in a left hand speaking state.
Figure 18:
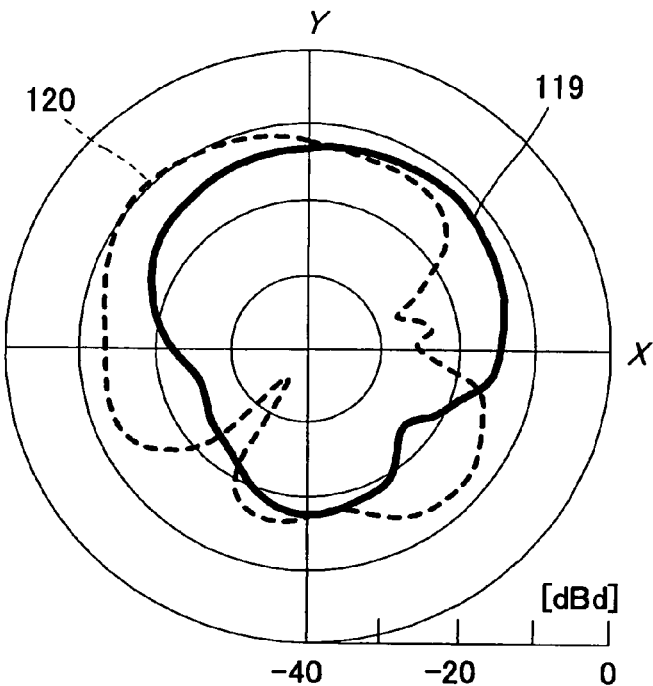
FIG. 18 is an explanatory view showing directivity when the first antenna element is selected while the portable radio device of the seventh embodiment is in a left hand speaking state.

As shown in FIG. 17, when the antenna element 101 side is selected by the high frequency switch 111, since the lower case 105 is held by the hand, the radiation of radio wave from the circuit board 103 provided in the lower case 105 is decreased and the radiation from electric current 115 on the antenna element 101 has a control. As a result, a main polarized wave component on a horizontal plane (XY plane) becomes a horizontal (Eφ) component. Accordingly, as shown in FIG. 18, in the directivity on the horizontal plane (XY plane), the directivity 120 of a horizontally polarized wave (Eφ) component is higher in the direction of a Y side (left hand side) than the directivity 119 of a vertically polarized wave (Eθ).

Figure 19:
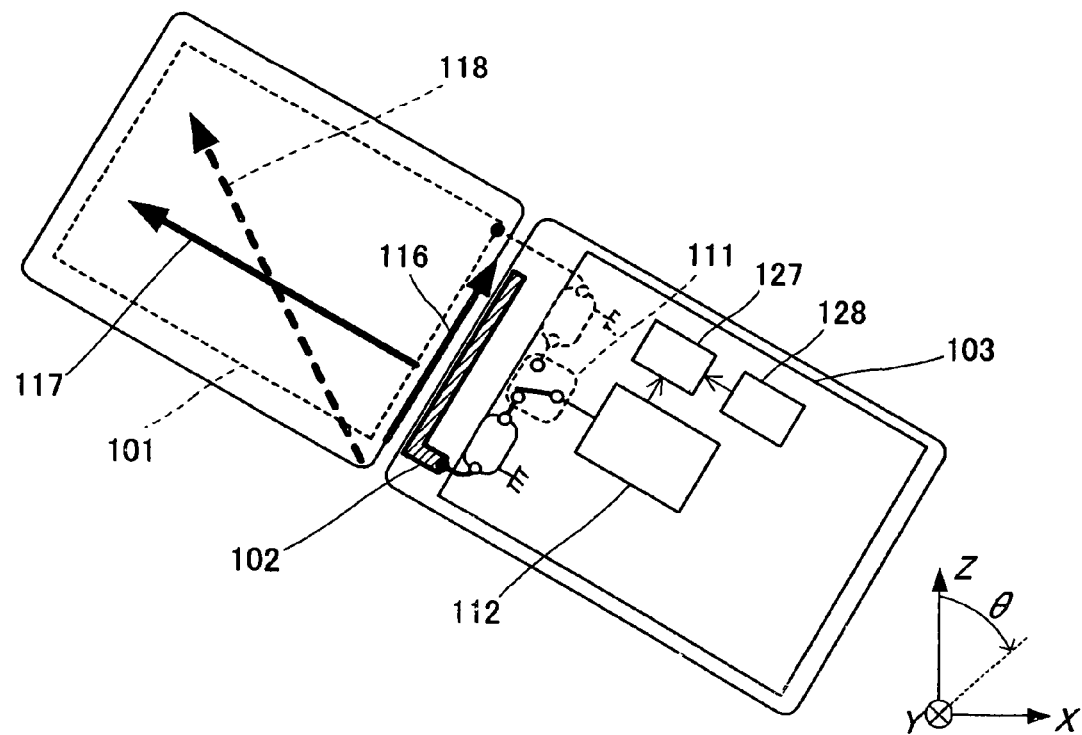
FIG. 19 is an explanatory view showing the operation of an antenna when a second antenna element is selected while the portable radio device of the seventh embodiment is in a left hand speaking state.
Figure 20:
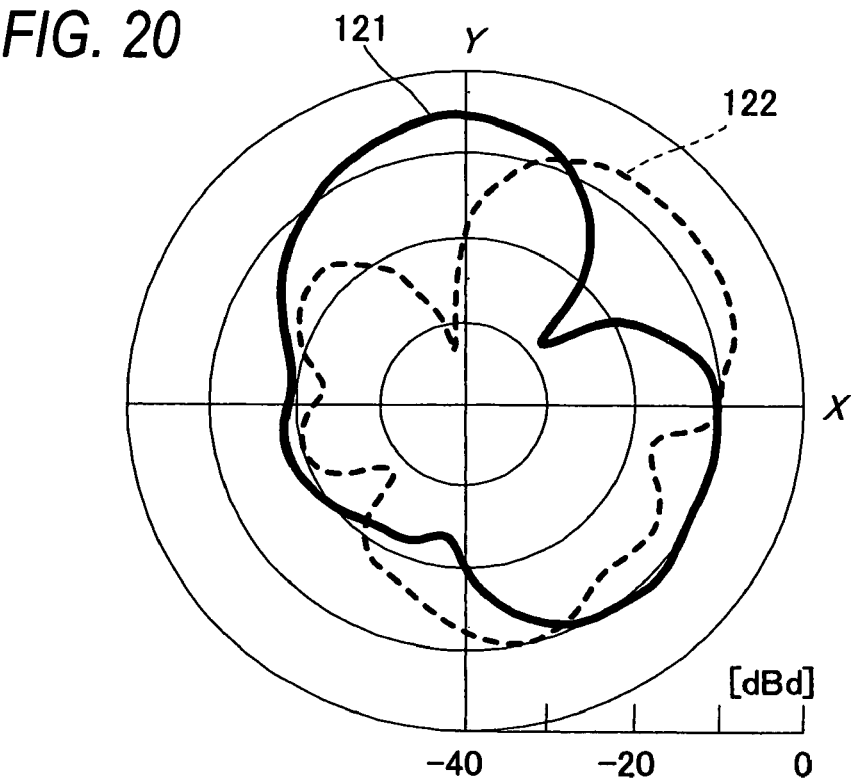
FIG. 20 is an explanatory view showing directivity when the second antenna element is selected while the portable radio device of the seventh embodiment is in a left hand speaking state.

On the other hand, as shown in FIG. 19, when the antenna element 102 side is selected by the high frequency switch 111, the radiation from an electric current 118 due to a vector synthesis of an electric current 116 on the antenna element 102 and an electric current 117 on the antenna element 101 electro-magnetically connected to the electric current 116 has a control. As a result, the vertically polarized wave (Eθ) component on the horizontal (XY) plane is higher than that when the antenna element 101 is selected. Accordingly, as shown in FIG. 20, in the directivity on the horizontal (XY) plane, the directivity 121 of the vertically polarized wave (Eθ) is higher in the direction of the Y side (left hand side) than the directivity 122 of the horizontally polarized wave (Eφ) component.

Generally, as an index showing the effective antenna performance of the portable radio device under a speaking state, a pattern average gain (PAG) expressed by a below-described formula (1) is employed. In the formula (1), $G_\theta(\phi)$ and $G_\phi(\phi)$ respectively indicate power directivities on the horizontal plane (XY plane) of the vertically polarized wave component and the horizontally polarized wave. Further, $C_{VH}$ indicates a correction factor related to the cross polarization power ratio (a power ratio of the vertically polarized wave component to the horizontally polarized wave component) of an arriving wave inputted to an antenna.

$$PAG = \frac{1}{2\pi}\int_0^{2\pi}\left[G_\theta\left(\frac{\pi}{2},\phi\right) + \frac{1}{C_{VH}}G_\phi\left(\frac{\pi}{2},\phi\right)\right]d\phi \quad (1)$$

It is known that the ordinary cross polarization power ratio in the multi-wave environment of a land mobile telecommunication is 4 to 9 dB. This indicates that the electric power of the vertically polarized wave of the arriving wave is higher by 4 to 9 dB than the electric power of the horizontally polarized wave. Accordingly, the formula (1) means that the vertically polarized wave is weighted and the power directivities on the horizontal plane are averaged. $C_{VH}$ is explained as 9 dB, hereinafter. Therefore, in the antenna for the portable radio device, the vertically polarized wave component is increased in a using state to obtain the high pattern average gain (PAG).

The PAG is used to show radiation characteristics in FIG. 18 and FIG. 20. The PAG obtained when the antenna element 101 is selected is −15 dBd (dipole ratio gain). On the other hand, the PAG obtained when the antenna element 102 is selected is −11.5 dBd, which is higher by 3.5 dB than the former. Accordingly, in the left hand speaking state, when the antenna element 102 is selected, the PAG becomes higher.

Figure 21:
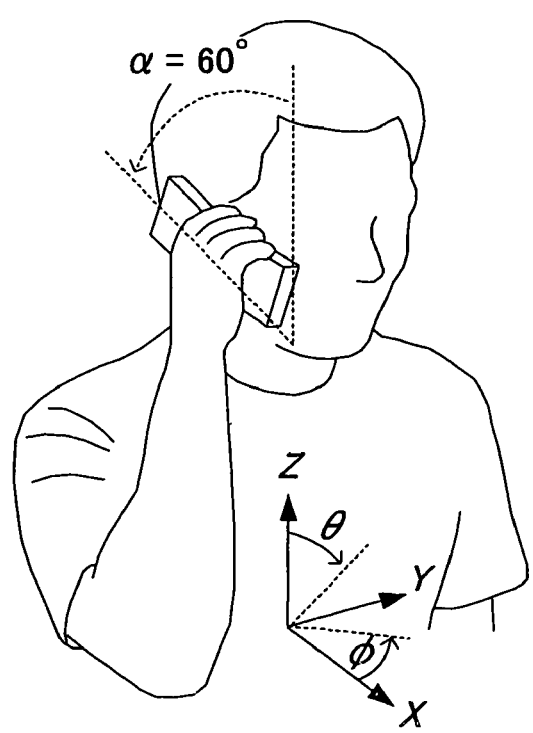
FIG. 21 is an explanatory view showing a state that the portable radio device of the seventh embodiment is held by a right hand at an inclination angle of 60 degrees.

Now, an antenna operation under a state that the user holds the portable radio device of this embodiment by a right hand to speak will be described below. FIG. 21 to FIG. 25 are explanatory views showing antenna characteristics and directivities when the portable radio device of this embodiment is held by a right hand (a right hand speaking state). FIG. 21 is an explanatory view showing a state that the portable radio device of this embodiment is held by the right hand at an inclination angle of 60 degrees.

Figure 22:
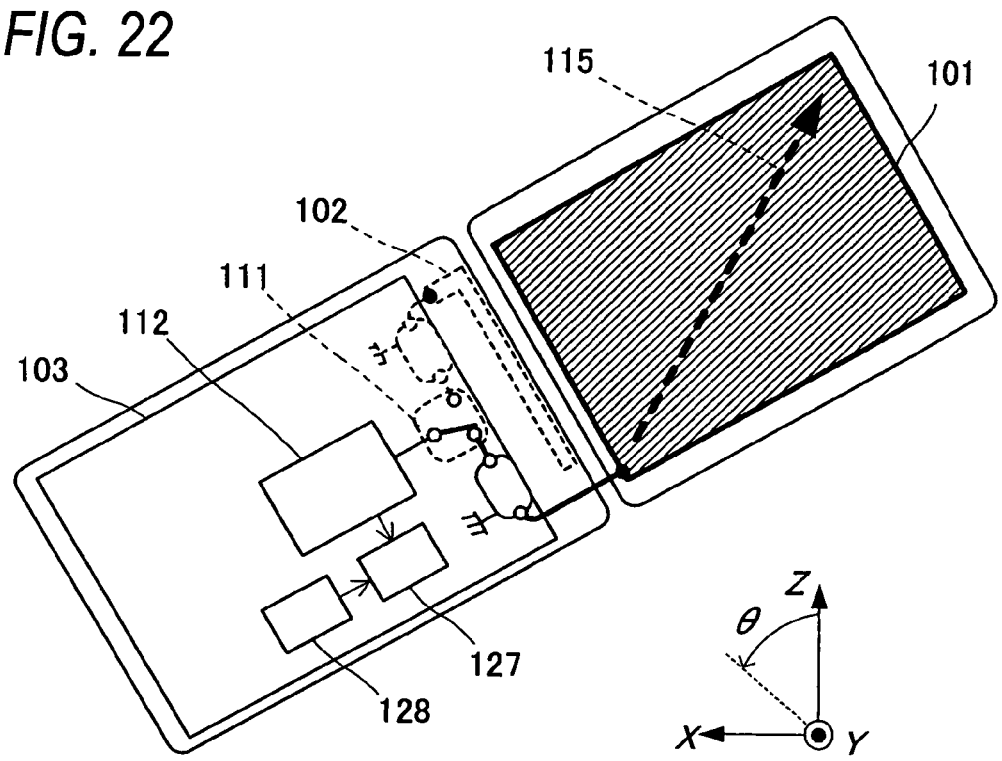
FIG. 22 is an explanatory view showing the operation of an antenna when a first antenna element is selected while the portable radio device of the seventh embodiment is in a right hand speaking state.
Figure 23:
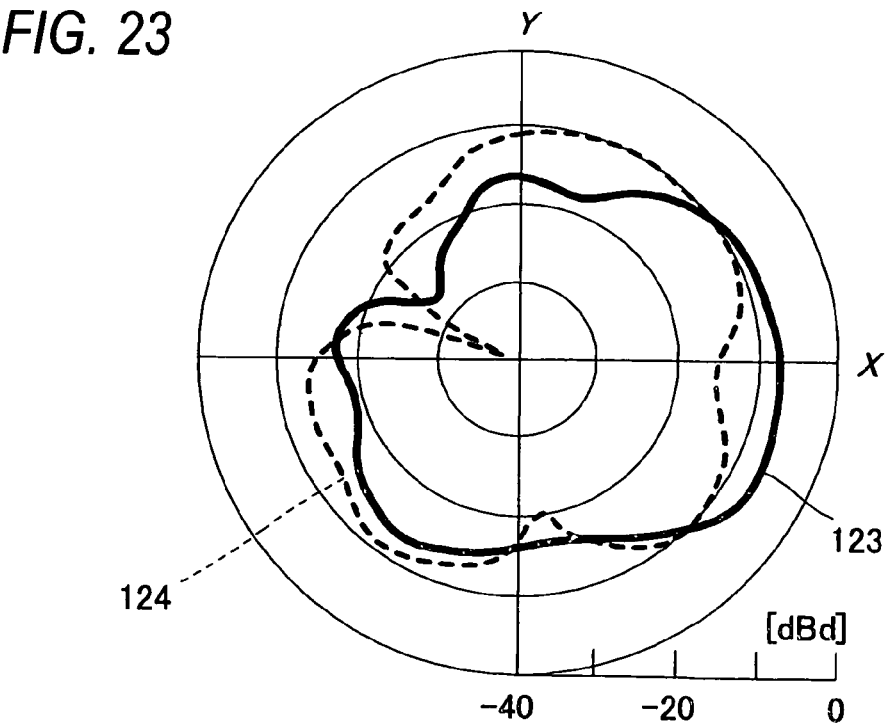
FIG. 23 is an explanatory view showing directivity when the first antenna element is selected while the portable radio device of the seventh embodiment is in a right hand speaking state.

As shown in FIG. 22, when the antenna element 101 side is selected by the high frequency switch 111, since the lower case 105 is held by the hand similarly to the case of the left hand, the radiation of radio wave from the circuit board 103 provided in the lower case 105 is decreased and the radiation from electric current 115 on the antenna element 101 has a control. As a result, the vertically polarized wave (Eθ) component on the horizontal (XY) plane is higher than that when the antenna element 102 is selected. Accordingly, as shown in FIG. 23, in the directivity on the horizontal plan (XY plane), the directivity 123 of the vertically polarized wave (Eθ) component is higher in the direction of a −Y side (right hand side) than the directivity 124 of the horizontally polarized wave (Eφ) component.

Figure 24:
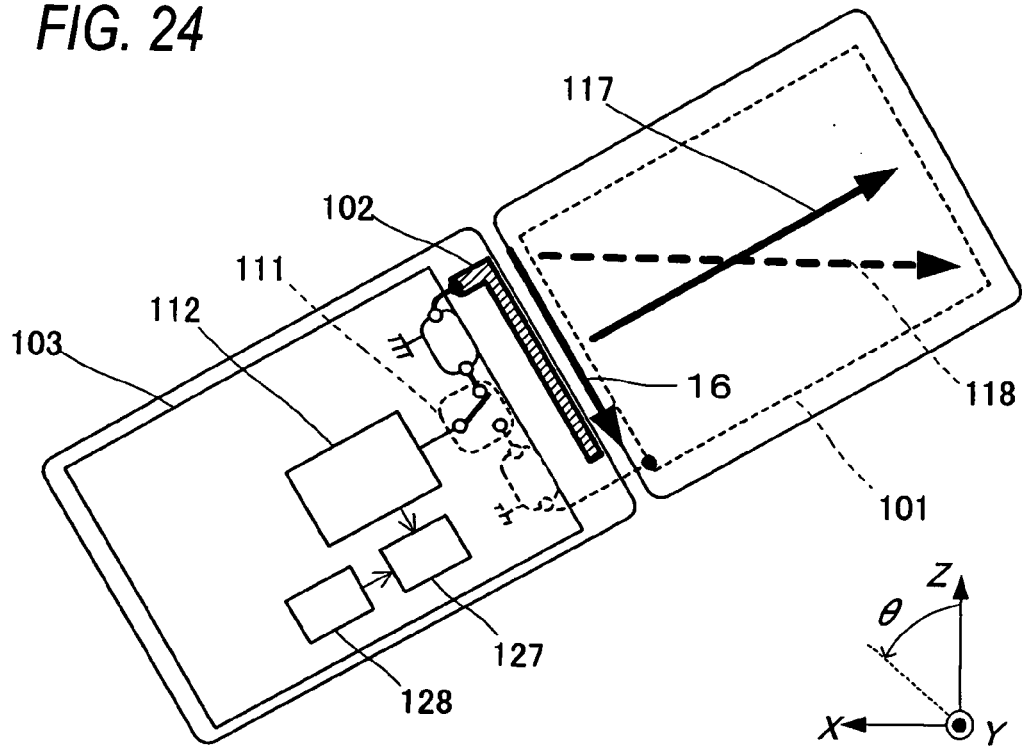
FIG. 24 is an explanatory view showing the operation of an antenna when a second antenna element is selected while the portable radio device of the seventh embodiment is in a right hand speaking state.

On the other hand, as shown in FIG. 24, when the antenna element 102 side is selected by the high frequency switch 111 the radiation from an electric current 118 due to a vector synthesis of an electric current 116 on the antenna element 102 and an electric current 117 on the antenna element 101 electro-magnetically connected to the electric current 116 has a control. As a result, the vertically polarized wave (Eθ) component on the horizontal (XY) plane is higher than that when the antenna element 101 is selected. As a result, the horizontally polarized wave (Eφ) component on the horizontal (XY) plane is increased. Accordingly, as shown in FIG. 25, in the directivity on the horizontal (XY) plane, the directivity 126 of the horizontally polarized wave (Eφ) component is higher in the direction of the −Y side (right hand side) than the directivity 125 of the vertically polarized wave (Eθ) component.

Figure 25:
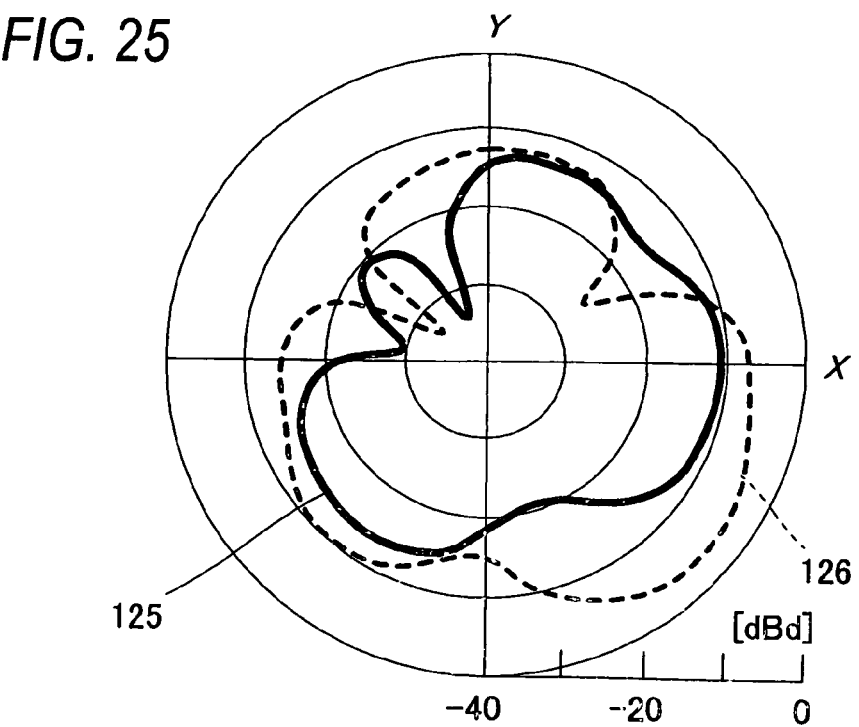
FIG. 25 is an explanatory view showing directivity when the second antenna element is selected while the portable radio device of the seventh embodiment is in a right hand speaking state.

As shown in FIG. 25, the PAG obtained when the antenna element 1 is selected is −11 dBd (dipole ratio gain). On the other hand, the PAG obtained when the antenna element 102 is selected is −14 dBd, which is lower by 3 dB than the former. Accordingly, in the right hand speaking state, when the antenna element 101 is selected, the PAG becomes higher.

As described above, in the portable radio device of this embodiment, when the upper case 104 and the lower case 105 are opened, either the antenna element 101 or the antenna element 102 having a higher antenna performance is selected. When the upper case and the lower case are closed, the antenna element 2 side is forcedly selected. Thus, the high antenna performance can be ensured in any of the opening and closing states. Further, when in the right hand speaking state, the antenna element 1 is selected, and, in the left hand speaking state, the antenna element 102 is selected, the high antenna gain as large as −11.5 dBd can be obtained in any state of the left hand speaking and the right hand speaking.

In this embodiment, as shown in FIG. 14, the feeding point 108 of the antenna element 101 is arranged at the right (Y) side and the feeding point 113 of the antenna element 102 is arranged at the left (−Y) side. When the arrangement of these feeding points is reversed, the tendency of the PAG in the left hand speaking state and the right hand speaking state is reversed. Even in this case, effects by the above-described diversity operation can be likewise obtained. Further, as an antenna element opposed to the antenna element 101 and the antenna element 102, the circuit board 103 provided in the lower case 105 is used. However, this antenna element may be, for instance, a metallic plate for shielding the circuit or a conductor plate provided exclusively for the antenna element.

Eighth Embodiment

Figure 26:
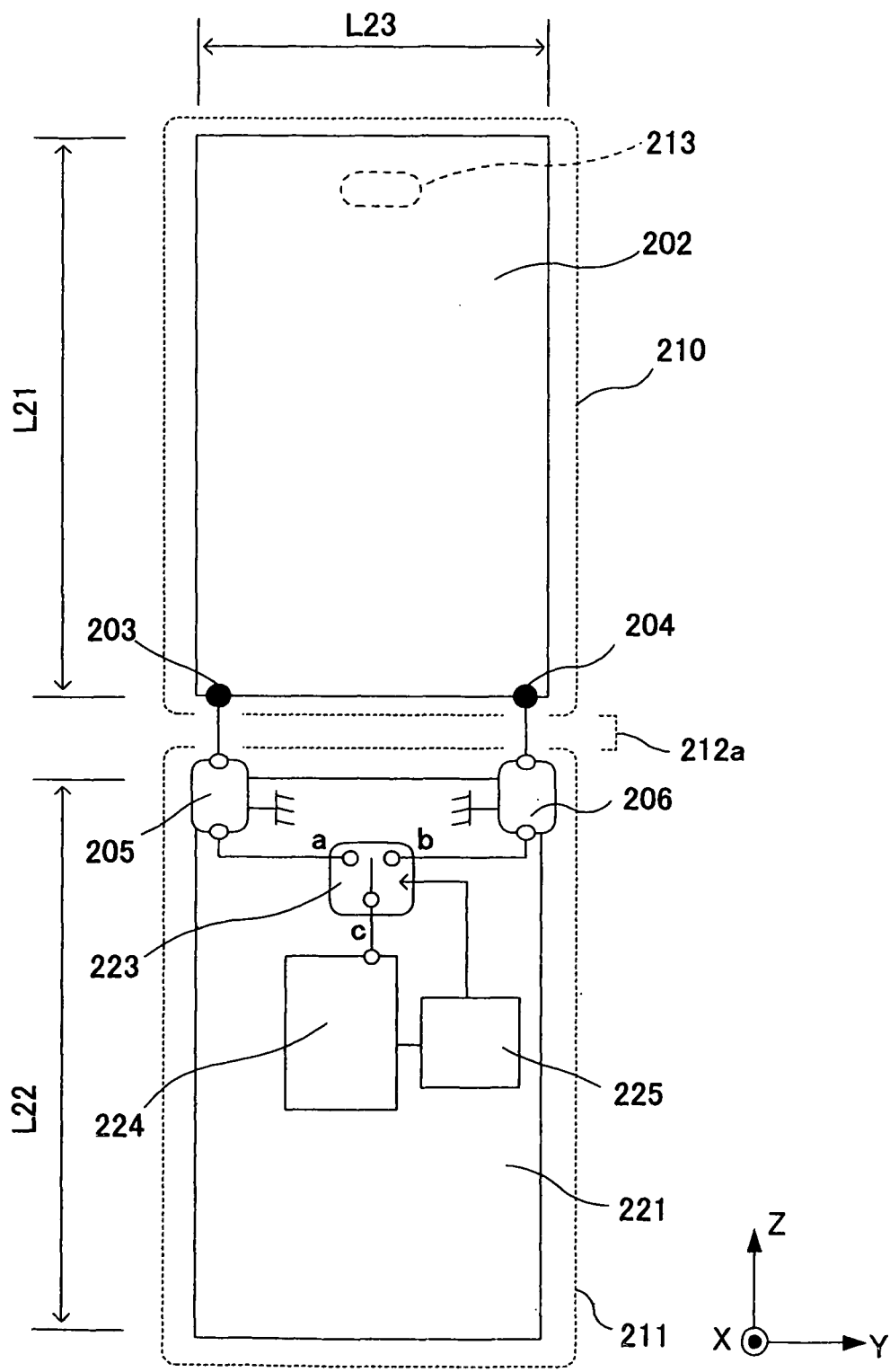
FIG. 26 is a front view showing a portable radio device for explaining an eighth embodiment.

FIG. 26 is a front view showing a portable radio device for explaining an eighth embodiment of the present invention. As shown in FIG. 26, the portable radio device of the eighth embodiment includes an upper case 210 as one example of a first casing and a lower case 211 as one example of a second casing connected to the upper case 210 by a hinge portion 212a as one example of a connection portion so as to freely rotate. The upper case 210 and the lower case 211 are made of molded products of a resin as an insulator.

In the front surface (the direction of an X side) of the upper case 210, a sound port 213 for guiding sound generated in a sound generating element such as a speaker provided in the upper case 210 to an external part is provided. The sound port 213 is provided so as to be located near the ear of a user when the user holds a foldable or collapsible portable telephone device 201 by a hand to speak.

In the upper case 210, a plate shaped conductor 202 is arranged as one example of a first antenna element. In the dimensions of the plate shaped conductor 202, for instance, a long side L21 has 90 mm and a short side L23 has about 45 mm. In the lower end (−Z side) of the plate shaped conductor 202, a feeding point 203 is provided in a left end (−Y side) and a feeding point 204 is provided in a right end (Y side). To the feeding point 203 and the feeding point 204, a matching circuit 205 and a matching circuit 206 are respectively connected through feeders (an illustration is omitted) or the like.

In the lower case 211, a circuit board 221 is provided. On the circuit board 221, circuit elements for realizing the functions of the portable radio device are mounted and the matching circuits 205 and 206, a switch 223, a radio circuit 224 and a control circuit 225 are disposed. In the dimensions of the circuit board 221, for instance, a long side L22 has 90 mm and a short side L23 has about 45 mm. On the circuit board 221, a ground pattern (an illustration is omitted) as the earth potential of the circuit is formed in a substantially entire surface.

In the matching circuit 205 and the matching circuit 206, the ground ends of the matching circuit 205 and the matching circuit 206 are respectively grounded in the ground pattern on the circuit board 221. The switch 223 is switched to select either the matching circuit 205 or the matching circuit 206. The selected matching circuit is connected to the radio circuit 224. Here, the switch 223 shows one example of a switching portion and is a high frequency switch composed of, for instance, an FET or a PIN diode. The radio circuit 224 includes a receiving circuit and a transmitting circuit. Further, the control circuit 225 detects a receiving signal level in the radio circuit 224 and controls the switch 223 to switch so as to select the matching circuit 205 or the matching circuit 206 in which the receiving signal level is constantly high.

In the above-described structure, the plate shaped conductor 202 and the ground pattern formed on the circuit board 221 operate as a dipole antenna. The matching circuit 205 and the matching circuit 206 match the impedance of the plate shaped conductor 202 with the circuit impedance (ordinarily, 50Ω) of the radio circuit 224.

Now, an antenna operation of the portable radio device according to the eighth embodiment will be described by way of an example in which operating frequency is set to 1.5 GHz.

Figure 27:
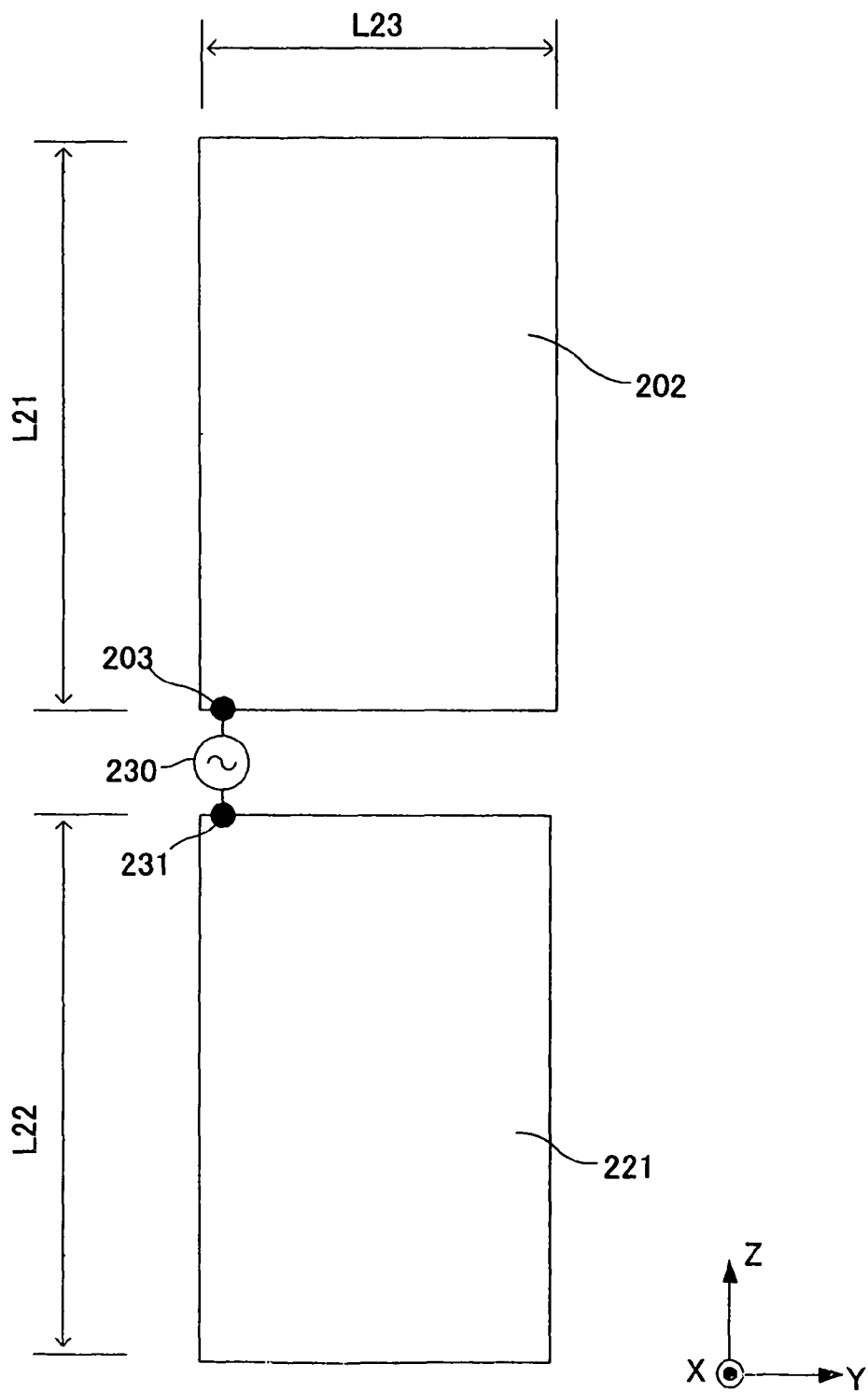
FIG. 27 is a diagram for explaining the operation of an antenna of the portable radio device according to the eighth embodiment.

FIG. 27 is a diagram showing the antenna operation when the switch 223 is switched to select the matching circuit 205, that is, the feeding point 203. In FIG. 27, parts designated by the same reference numerals as those of FIG. 26 show the same components.

As shown in FIG. 27, when the feeding point 203 side is selected, a feeding source 230 is connected to the feeding point 203 in the left end (−Y side) of the plate shaped conductor 202 and a feeding point 231 in the left end (−Y side) of the circuit board 221.

Figure 28:
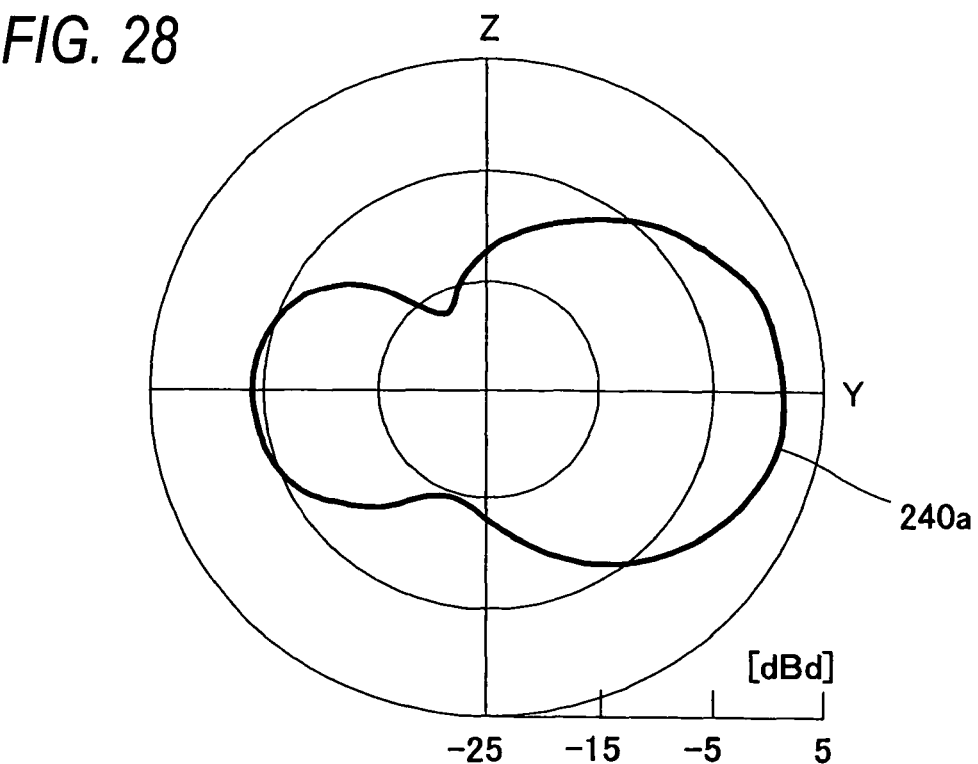
FIG. 28 is a diagram showing the directivity of the antenna of the portable radio device according to the eighth embodiment.

FIG. 28 shows a directivity of a dipole antenna on a YZ plane when the switch 223 is switched to select the matching circuit 205. As shown by the directivity 240a in FIG. 28, an antenna gain in the direction of Y is higher by about 5 dB than a gain in the direction of −Y.

Figure 29:
FIG. 29 is a diagram showing a speaking state that a user holds the portable radio device according to the eighth embodiment by a left hand.

FIG. 29 shows a state that the user holds the portable radio device by a left hand- to speak. Under this state, the portable radio device is held so that the sound port 213 (see FIG. 26) directed to the front surface, that is, to the direction of X is located near the left ear of the user. At this time, as shown in FIG. 29, the direction of Y in a coordinate system in FIG. 26 is directed to a direction inclined slightly forward viewed from the direction of a vertex by the user. As shown in FIG. 28, when the switch 223 is switched to select the feeding point 203, the antenna gain in the direction of Y is higher than that in the direction of −Y. Thus, in FIG. 29, the antenna gain is high in the direction of the vertex and low in the direction of the shoulder of the user. Accordingly, an influence of the shoulder of the user is reduced and an antenna performance in a speaking state when the user holds the portable radio device by the left hand is increased.

Figure 30:
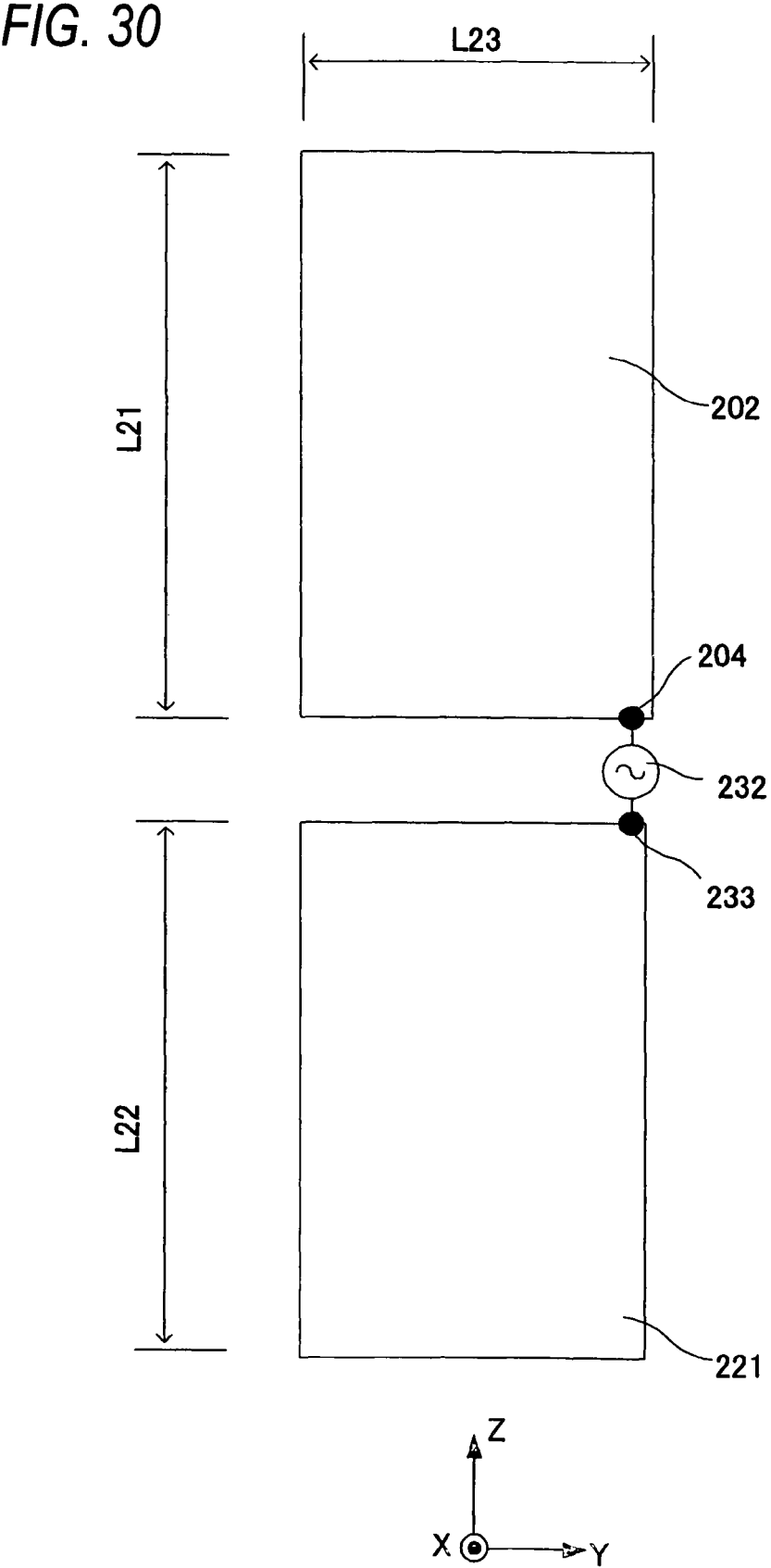
FIG. 30 is a diagram for explaining the operation of the antenna of the portable radio device according to the eighth embodiment.

FIG. 30 is a diagram showing an antenna operation when the switch 223 is switched to select the matching circuit 206, that is, the feeding point 204. In FIG. 30, parts designated by the same reference numerals as those of FIG. 26 show the same components.

As shown in FIG. 30, when the feeding point 204 side is selected, a feeding source 232 is connected to the feeding point 204 at the right end (Y side) of the plate shaped conductor 202 and a feeding point 233 at the right end (Y side) of the circuit board 221.

Figure 31:
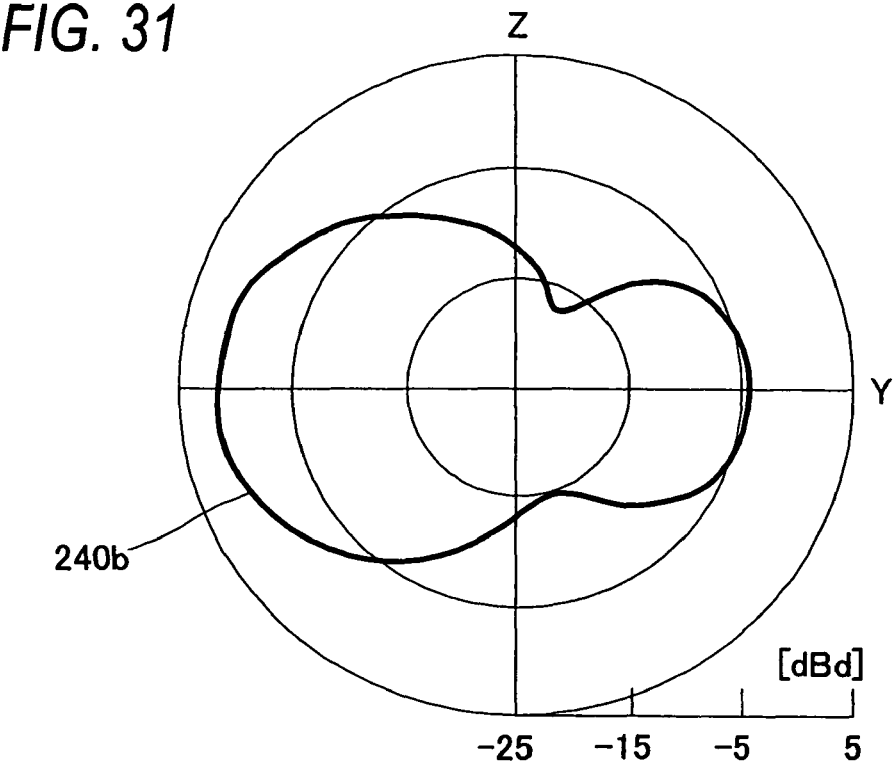
FIG. 31 is a diagram showing the directivity of the antenna of the portable radio device according to the eighth embodiment.

FIG. 31 shows a directivity of a dipole antenna on the YZ plane when the switch 223 is switched to select the matching circuit 206. As shown by the directivity 240b in FIG. 31, an antenna gain in the direction of −Y is higher by about 5 dB than an antenna gain in the direction of Y. That is, the directivity 240b shows opposite characteristics to those of the directivity shown in FIG. 28.

Figure 32:
FIG. 32 is a diagram showing a speaking state that a user holds the portable radio device according to the eighth embodiment by a right hand.

FIG. 32 shows a state that the user holds the portable radio device by a right hand to speak. As described above, when the switch 223 is switched to select the feeding point 204, since the antenna gain in the direction of −Y is higher than that in the direction of Y, the antenna gain is high in the direction of the vertex and low in the direction of the shoulder of the user. Accordingly, an influence of the shoulder of the user is reduced to improve an antenna performance under a speaking state in which the user holds the portable radio device by the right hand.

In this embodiment, the two feeding points are arranged at the left end and the right end of the plate shaped conductor 202. However, for instance, three or more feeding points may be disposed at different positions and they may be switched. In this case, tree or more of different directivities can be obtained.

Further, the dimensions of the plate shaped conductor 202 and the circuit board 221 are not limited to those shown in the eighth embodiment. When the ratio of the length of the short side to the length of long side is about 1/5 or higher, an effect of switching the directivity may be obtained.

Further, the control circuit 225 detects the direction of the portable radio device, that is, by which of the hands the user holds the portable radio device. The switch 223 may be switched in accordance with the detected results. In that case, the control circuit 225 is not necessarily connected to the radio circuit 224.

In the portable radio device according to the eighth embodiment of the present invention, a plurality of feeding portions are provided in the plate shaped conductor and these feeding-portions are switched by the switch 223, so that the directivity of an antenna can be changed. Further, a directional diversity effect can be obtained without adding antenna elements for diversity. Further, even when the portable radio device is held either the left hand or the right hand under the speaking state, a high antenna performance can be obtained.

Ninth Embodiment

Figure 33:
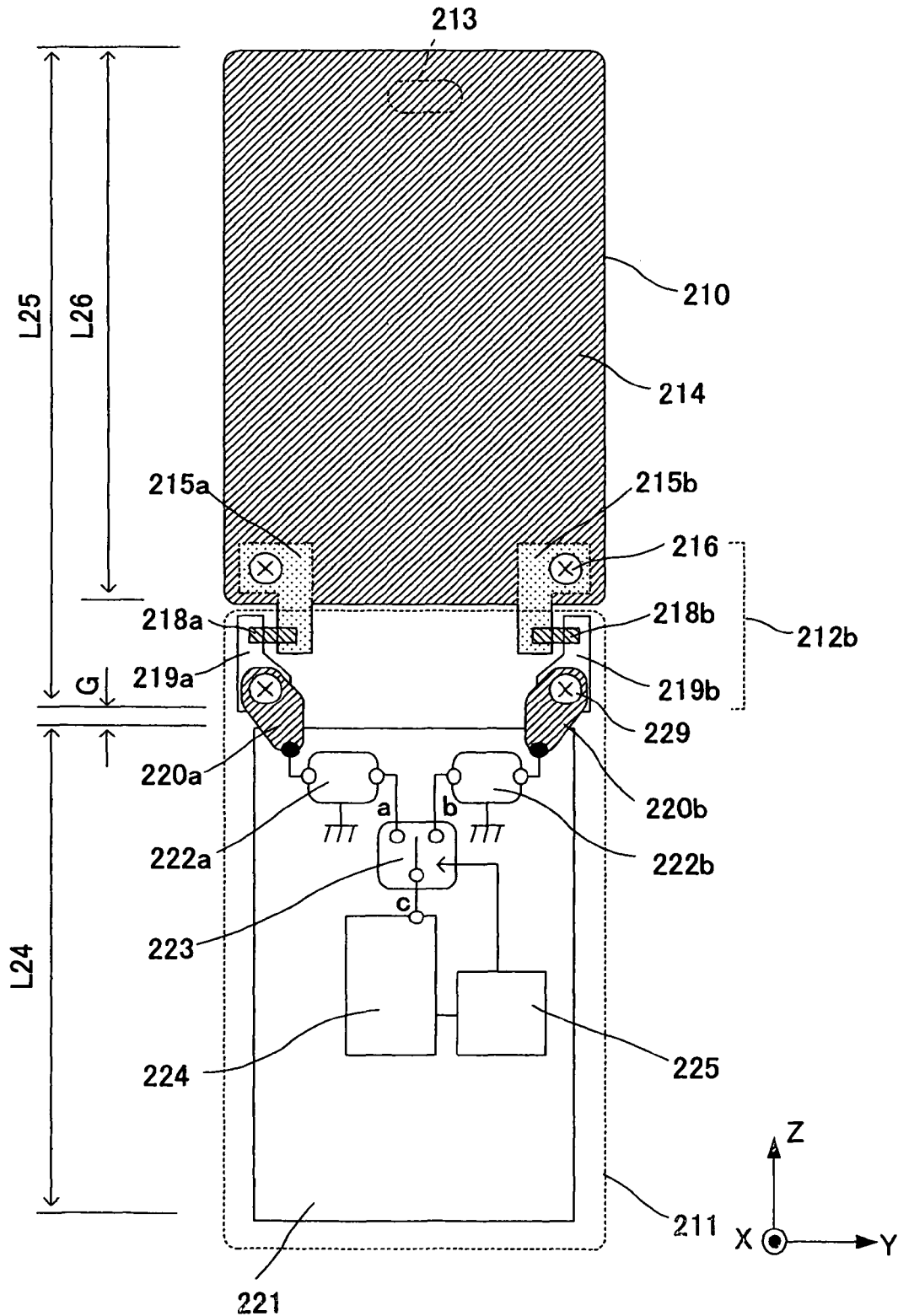
FIG. 33 is a front view showing a portable radio device for explaining a ninth embodiment.
Figure 34:
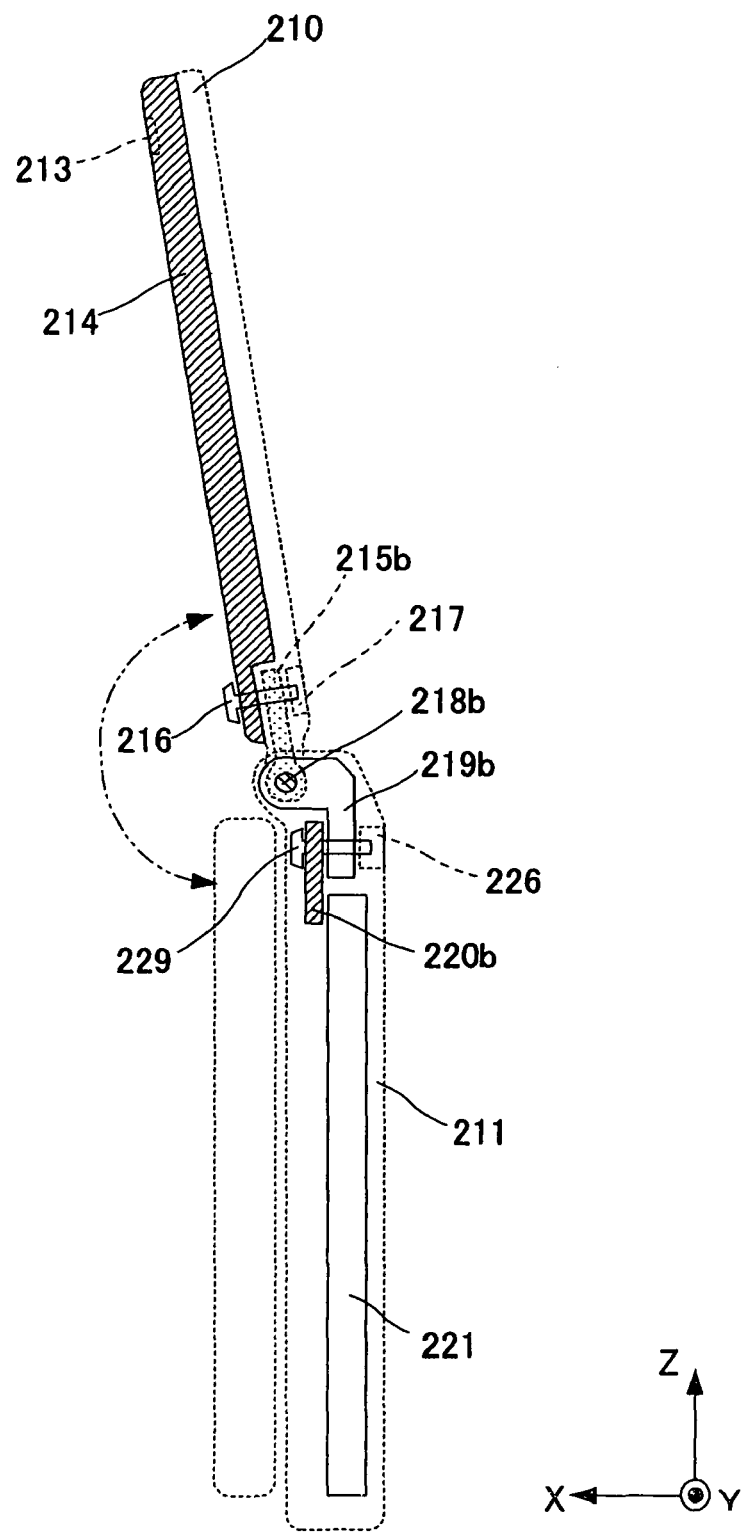
FIG. 34 is a side view showing the portable radio device for explaining the ninth embodiment of the present invention.

FIG. 33 is a front view showing a portable radio device for explaining a ninth embodiment of the present invention. FIG. 34 is a side view showing the portable radio device for explaining the ninth embodiment of the present invention. In FIGS. 33 and 34, duplicated portions to those of FIG. 26 are designated by the same reference numerals and the explanation thereof is omitted.

As shown in FIGS. 33 and 34, the portable radio device of the ninth embodiment employs a structure that an upper case 210 is connected to a lower case 211 by a hinge portion 212b and may have two states including an opening state and a closing state by rotating the cases on the hinge portion 212b.

In the front surface side (a side in the direction of X) of the upper case 210 in the drawing, that is, on a surface having a sound port 213 arranged, a metallic frame 214 is mounted. For the metallic frame 214, light metal having high electric conductivity and high strength, for instance, magnesium alloy is used. Such kind of metal is used so that the strength of the thin upper case 210 can be ensured and the metallic frame 214 can function as an antenna element. The length L26 of the long side of the metallic frame 214 has, for instance, about 90 mm. The outer package surface of the metallic frame 214 is ordinarily painted for dressing. Here, an explanation thereof is omitted.

In the lower case 211, a circuit board 221 is provided. In the circuit board 221, matching circuits 222a and 222b, a switch 223, a radio circuit 224 and a control circuit 225 are arranged.

The hinge portion 212b includes hinge fittings 215a and 215b for connecting the upper case 210 to the lower case 211, hinge fittings 219a and 219b provided in the lower case 211, and rotating shafts 218a and 218b for connecting the hinge fittings 215a and 215b to the hinge fittings 219a and 219b so as to respectively freely rotate.

In both the right and left side parts (directions of ±Y) of the lower end (−Z side) of the metallic frame 214, tapped holes for attaching the metallic frame 214 to the upper case 210 are opened. On the hinge fittings 215a and 215b formed in L shapes, tapped holes for attaching them to the upper case 210 are opened. Attaching screws 216 are attached to tapped hole parts 217 of the upper case 210 respectively through the tapped holes of the metallic frame 214 and the hinge fittings 215a and 215b. According to this structure, the metallic frame 214 is electrically connected to the hinge fittings 215a and 215b, and the upper case 210 and the metallic frame 214 are mechanically fixed to the hinge fittings 215a and 215b.

The hinge fitting 215a is connected to the hinge fitting 219a provided in the left side (−Y side) of the upper end (Z side) of the lower case 211 through the rotating shaft 218a so as to freely rotate. The hinge fitting 215b is connected to the hinge fitting 219b provided in the right side (Y side) of the upper end (Z side) of the lower case 211 through the rotating shaft 218b so as to freely rotate.

In the hinge fittings 219a and 219b, tapped holes for attaching them to the lower case 211 are opened. Further, in feeding terminals 220a and 220b, tapped holes are also opened. Attaching screws 229 are attached to tapped hole parts 226 (FIG. 34) of the lower case 211 through the tapped holes of the feeding terminals 220a and 220b and the hinge fittings 219a and 219b. According to this structure, the hinge fittings 219a and 219b are respectively electrically connected to the feeding terminals 220a and 220b, and the lower case 211, the hinge fittings 219a and 219b and the feeding terminals 220a and 220b are respectively mechanically fixed.

The hinge fittings 215a and 215b, the rotating shafts 218a and 218b and the hinge fittings 219a and 219b are respectively made of electrically conductive metal and are electrically conducted at contact points between them. Accordingly, the metallic frame 214 is electrically connected to the feeding terminals 220a and 220b through the attaching screws 216, the hinge fittings 215a and 215b, the rotating shafts 218a and 218b, the hinge fittings 219a and 219b and the attaching screws 229 and mechanically fixed.

In the lower case 211, the matching circuit 222a is arranged in the left end (a side in the direction of −Y) part of the upper end (the side of the direction of Z). The matching circuit 222a is connected to the feeding terminal 220a. Further, the matching circuit 222b is arranged in the right end (a side in the direction of Y) part of the upper end (the side in the direction of Z) of the lower case 211. The matching circuit 222b is connected to the feeding terminal 220b. The feeding terminal 220a is connected to the matching circuit 222a by, for instance, a spring contact or solder. Similarly, the feeding terminal 220b is connected to the matching circuit 222b on the circuit board 221 provided in the lower case 211, by for instance, a spring contact or solder. The long side L24 of the circuit board 22 has, for instance, about 90 mm.

The matching circuit 222a is connected to a terminal a of the switch 223 on the circuit board 221. The matching circuit 222b is connected to a terminal b of the switch 223. The ground ends (an illustration is omitted) of the matching circuits 222a and 222b are grounded in a ground pattern on the circuit board 221. The switch 223 is switched to select either the matching circuit 222a or 222b and the selected matching circuit is connected to the radio circuit 224. Here, the switch 223 is a high frequency switch formed with, for instance, an FET or a PIN diode. The radio circuit 224 includes a receiving circuit and a transmitting circuit or the like. The control circuit 225 detects a receiving signal level in the radio circuit 224 and controls the switch 223 to switch so as to select the matching circuit 222a or the matching circuit 222b in which the receiving signal level is constantly high.

According to the above-described structure, the metallic frame 214 and the hinge portion 212b and the ground pattern on the circuit board 221 operate as a dipole antenna. At this time, the metallic frame 214 and the hinge portion 212b operate as a first antenna element having the length of L25 (for instance, 110 mm). The matching circuits 222a and 222b match the impedance of the first antenna element with the input impedance (ordinarily, 50Ω) of the radio circuit 224. Further, the ground pattern on the circuit board 221 having the length of L24 operates as a second antenna element. Here, a gap G between the hinge fittings 219a and 219b and the ground pattern on the circuit board 221 is desirably wide as much as possible (for instance, 2 mm or more, or when the portable radio device is used with 800 MHz, λ/20 or more) from the viewpoint of an antenna performance.

Now, an antenna operation of the portable radio device having the above-described structure will be described below.

When the switch 223 is switched to select the matching circuit 222a side, that is, the feeding terminal 220a side, characteristics near the directivity 240a shown in FIG. 28 are obtained. When the switch 223 is switched to select the matching circuit 222b side, that is, the feeding terminal 220b side, characteristics near the directivity 240b shown in FIG.

31 are obtained. Accordingly, a directional diversity effect can be obtained for arriving radio waves inputted to the portable radio device from various directions.

Further, as shown in FIG. 29, in the speaking state in which the portable radio device is held by the left hand, the matching circuit 222a is selected to obtain a high antenna performance. On the contrary, as shown in FIG. 32, in the speaking state in which the portable radio device is held by the right hand, the matching circuit 222b is selected. Under this state, the high antenna performance can be likewise obtained. Accordingly, the switch 223 is switched to select either of the matching circuit 222a and the matching circuit 222b so that a state can be selected in which the antenna performance is increased correspondingly to both the states that the portable radio device is held by the left hand or the right hand under the speaking state.

In the ninth embodiment, the two feeding portions are arranged at the left end and the right end of the plate shaped metallic frame 214. However, for instance, three or more feeding portions may be disposed at different positions and they may be switched. In this case, tree or more of different directivities can be obtained.

Further, the dimensions of the metallic frame 214 and the circuit board 221 are not limited to those shown in the ninth embodiment. When the ratio of the short side to the long side is about ⅕ or higher, an effect of switching the directivity may be obtained.

Further, in the ninth embodiment, the two hinge fittings are spaced apart right and left and attached to the right and left sides. However, even when the hinge fitting 219a is formed integrally with the hinge fitting 219b, if a plurality of feeding portions is provided at prescribed intervals, the same effects can be obtained.

Further, the control circuit 225 detects the direction of the portable radio device, that is, by which of the hands the user holds the portable radio device. The switch 223 may be switched in accordance with the detected results. In that case, the control circuit 225 is not necessarily connected to the radio circuit 224.

In the ninth embodiment, the hinge fittings 215a and 215b, the rotating shafts 218a and 218b and the hinge fittings 219a and 219b are respectively electrically conducted together. However, they may be electro-magnetically connected together by a capacitive reactance.

In the portable radio device according to the ninth embodiment of the present invention, a plurality of feeding portions are connected to the hinge portions connected to the metallic frame and these feeding portions are switched by the switch, so that the directivity of an antenna can be changed. Further, a directional diversity effect can be obtained without adding antenna elements for diversity. Further, even when the portable radio device is held either the left hand or the right hand under the speaking state, a high antenna performance can be obtained. Further, the metallic frame forming a part of the upper case has a function of the antenna element. Thus, the decrease of thickness of the portable radio device can be realized.

Tenth Embodiment

Figure 35:
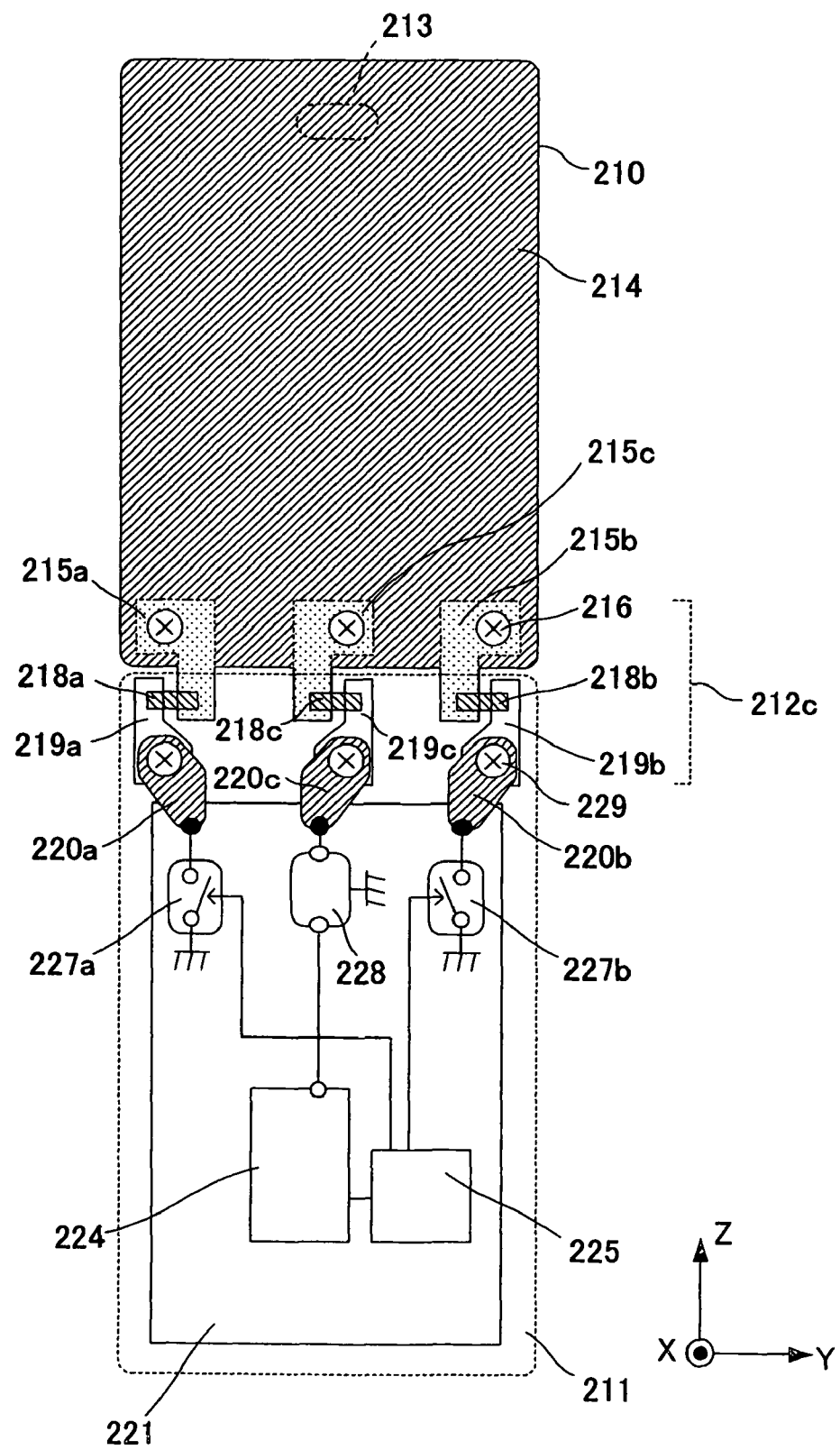
FIG. 35 is a front view showing a portable radio device for explaining a tenth embodiment of the present invention.

FIG. 35 is a front view showing a portable radio device for explaining a tenth embodiment of the present invention. In FIG. 35, duplicated portions to those of FIG. 26 are designated by the same reference numerals and the explanation thereof is omitted.

As shown in FIG. 35, in the portable radio device according to the tenth embodiment, a hinge portion 212c that includes a hinge fitting 215c provided between hinge fittings 215a and 215b, a rotating shaft 218c attached to the hinge fitting 215c so as to freely rotate and a hinge fitting 219c attached to the rotating shaft 218c so as to freely rotate is attached to an upper case 210. To the hinge portion 212c, a feeding terminal 220c attached to the hinge fitting 219c is connected. The feeding terminal 220c is connected to a matching circuit 228 disposed on a circuit board 221 by a spring contact or solder or the like. The matching circuit 228 is connected to a radio circuit 224. Further, the ground end (an illustration is omitted) of the matching circuit 228 is grounded in a ground pattern (an illustration is omitted) of the circuit board. In the tenth embodiment, the feeding terminal 220c and the matching circuit 223 show one examples of a feeding portion.

A switch 227a is connected between a feeding terminal 220a and the ground pattern (the illustration is omitted) of the circuit board 221. A switch 227b is connected between a feeding terminal 220b and the ground pattern (the illustration is omitted) of the circuit board 221. In the tenth embodiment the feeding terminals 220a and 220b show one examples of a ground portion.

The switches 227a and 227b are high frequency switches formed by, for instance, an FET or a PIN diode like the switch 223 shown in FIG. 33. A control circuit 225 detects a receiving signal level in the radio circuit 224 and controls the switch (switches 227a and 227b) in which the receiving signal level is always high to be selected.

An antenna operation of the portable radio device constructed as described above will be described below.

Figure 36:
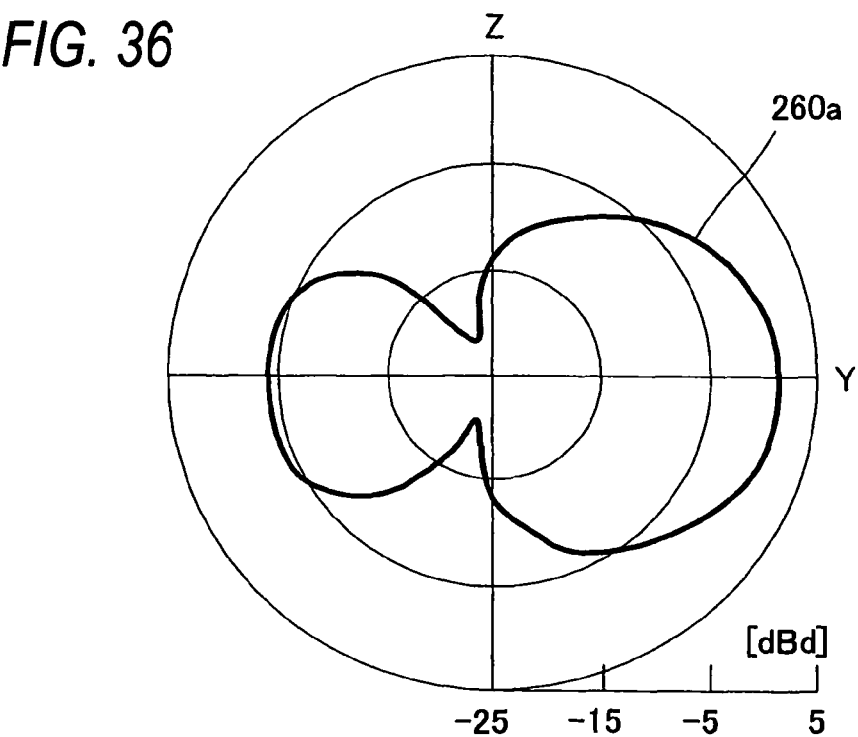
FIG. 36 is a diagram showing the directivity of an antenna of the portable radio device according to the tenth embodiment of the present invention.
Figure 37:
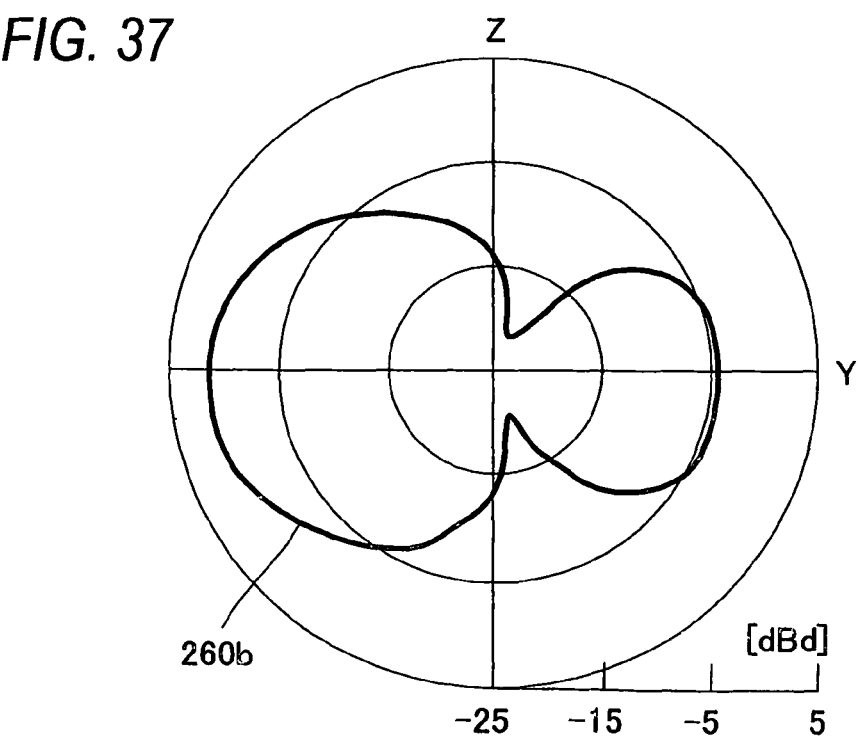
FIG. 37 is a diagram showing the directivity of the antenna of the portable radio device according to the tenth embodiment of the present invention.

In FIG. 35, when the switch 227a is turned ON and the switch 227b is turned OFF, the directivity of an antenna is high in a gain in the direction of Y like the directivity 260a shown in FIG. 36. On the contrary, when the switch 227a is turned OFF and the switch 227b is turned ON, the directivity of an antenna is high in a gain in the direction of −Y like the directivity 260b shown in FIG. 37. Further, when both the switch 227a and the switch 227b are turned OFF, an intermediate directivity of the directivity 260a and the directivity 260b is obtained. When both the switch 227a and the switch 227b are turned ON, antenna characteristics are deteriorated. Therefore, the control operation of the control circuit 225 is desirably set not to select this state.

Accordingly, a directional diversity effect that can control three kinds of directivities for arriving radio waves inputted to the portable radio device from various directions can be obtained.

Further, in the speaking state shown in FIG. 29 obtained when the portable radio device is held by the left hand, the switch 227a is turned ON and the switch 227b is set to OFF. Thus, a high antenna performance is obtained. On the contrary, in the speaking state as shown in FIG. 32 obtained when the portable radio device is held by the right hand, the switch 227a is turned OFF and the switch 227b is set to ON. Under this state, the high antenna performance is also obtained.

In the tenth embodiment, the feeding portion is disposed at a central portion and the two ground portions for switching a ground are disposed at both ends. However, even when the feeding portion is disposed at one end and the ground portion is disposed at one end opposed thereto, a directional diversity effect can be obtained.

Further, the control circuit 225 detects the direction of the portable radio device, that is, by which of the hands the user holds the portable radio device. The switch 223 may be switched in accordance with the detected results. In that case, the control circuit 225 is not necessarily connected to the radio circuit 224.

In the tenth embodiment, the hinge fittings 215a, 215b and 215c, the rotating shafts 218a, 218b and 218c and the hinge fittings 219a, 219b and 219c are respectively electrically conducted together. However, they may be electro-magnetically connected together by a capacitive reactance.

In the portable radio device according to the tenth embodiment of the present invention, the feeding portion and a plurality of ground portions are connected to the hinge portions connected to a metallic frame and the ground portions are switched by the switch, so that the directivity of an antenna can be changed. Further, a directional diversity effect can be obtained without adding antenna elements for diversity. Further, even when the portable radio device is held either the left hand or the right hand under the speaking state, a high antenna performance can be obtained. Further, the metallic frame forming a part of the upper case has a function of the antenna element. Thus, the decrease of thickness of the portable radio device can be realized.

The present invention is described in detail by referring to the specific embodiments, however, it is to be understood to a person with ordinary skill in the art that various changes or modifications may be made without departing the spirit and the scope of the present invention.

This application is based on Japanese Patent Application (No. 2002-210612) filed in Jul. 19, 2002, Japanese Patent Application (No. 2003-015675) filed in Jan. 24, 2003, and Japanese Patent Application (No. 2003-167962) filed in Jun. 12, 2003 and the contents thereof are taken in as references.

INDUSTRIAL APPLICABILITY

As described above, the portable radio device according to the present invention can obtain a high performance in various using states.

The invention claimed is:

1. A portable radio device comprising:
a first casing;
a second casing;
at least two connection portions, each connection portion connecting the first casing to the second casing so as to freely rotate through a rotation shaft provided in each of the at least two connection portions;
a first antenna element, provided in the first casing;
a conductor element, provided in the second casing; and
at least two feeding portions provided in the second casing, each feeding portion having one end electrically connected to the first antenna element through each of the at least two connection portions including the rotation shaft and the other end electrically connected to the conductor element,
wherein the connection portion including the rotation shaft has electric conductivity to form a dipole antenna as a whole by the first antenna element, the connection portion and the conductor element,
wherein the connection portion is arranged away from the conductor element at a distance, and
wherein the feeding portions are separate from each other along the rotation shaft in a prescribed gap,
wherein the electrical connection between the first antenna element and the conductor element is switchable among at least two routes, each route electrically connecting the first antenna element to the conductor element through each different one of the feeding ports and each different one of the connection portions, to change a directivity of the dipole antenna.

2. The portable radio device as set forth in claim 1, wherein a plurality of first antenna elements are provided in the first casing; and the portable radio device further comprising a switching portion which switches the plurality of first antenna elements so as to connect to the feeding portion.

3. The portable radio device as set forth in claim 2, wherein the switching portion switches whether the plurality of the first antenna elements are electrically connected to the feeding portion or the plurality of the first antenna elements are electrically connected to the conductor element, respectively.

4. The portable radio device as set forth in claim 2, further comprising a half-wavelength element being electrically connected between at least one of the plurality of the first antenna elements and the switching portion.

5. The portable radio device as set forth in claim 2, further comprising a plurality of half-wavelength elements being respectively electrically connected to the plurality of the first antenna elements,
wherein the switching portion selectively switches the plurality of the first antenna elements and the plurality of the half-wavelength elements so as to connect to the feeding portion.

6. The portable radio device as set forth in claim 2, further comprising:
a casing opening and closing state detecting portion, detecting whether or not the first casing and the second casing are opened to each other; and
a control portion, controlling the switching portion in accordance with the detected result of the casing opening and closing state detecting portion.

7. The portable radio device as set forth in claim 2, further comprising a control portion, determining a receiving level of a radio circuit portion to control the switching portion so as to raise the receiving level.

8. The portable radio device as set forth in claim 1, further comprising a plurality of impedance matching portions respectively corresponding to the plurality of the first antenna elements.

9. The portable radio device as set forth in claim 1, wherein the antenna element and the conductor element are respectively formed in plate shapes along the surface of the first casing and the second casing.

10. The portable radio device as set forth in claim 9, further comprising:
a circuit board, provided in the second casing and having a radio circuit,
wherein the conductor element is formed in a ground pattern which is formed on the circuit board provided in the second casing;
wherein a ground of the radio circuit portion is electrically connected to the ground pattern; and
wherein the feeding portion is provided in the radio circuit portion.

11. A portable radio device as set forth in claim 1, further comprising:
a second antenna element, provided in the second casing near the connection portion;
an opening and closing state detecting portion, detecting the opening and closing states of the first casing and the second casing; and
a switching portion, selecting and switching any one of the first antenna element and the second antenna element to a connection to a signal processing portion for performing a signal process in accordance with the detected result of the casing opening and closing state detecting portion,
wherein when the first casing and the second casing are opened, the first antenna element and the conductor element form the dipole antenna; and
wherein when the first casing and the second casing are closed, the second antenna element and the conductor element form a mono-pole antenna.

12. The portable radio device as set forth in claim 11, wherein when the first casing and the second casing are opened, the switching portion selects the first antenna element; and wherein when the first casing and the second casing are closed, the switching portion selects the second antenna element.

13. The portable radio device as set forth in claim 11, further comprising:

a first matching portion, matching the impedance of the first antenna element to a prescribed value; and a second matching portion, matching the impedance of the second antenna element to a prescribed value.

14. The portable radio device as set forth in claim 1, further comprising:

a second antenna element provided in the second casing near the connection portion;

a receiving field intensity measuring portion, measuring the receiving field intensity of a signal received by the first antenna element or the second antenna element; and a switching portion, selecting and switching the antenna element having a higher receiving field intensity to a connection to a signal processing portion for performing a signal process in accordance with the measured result of the receiving field intensity measuring portion, wherein the first antenna element has a first feeding point for electrically connecting to the conductor element;

wherein the second antenna element has second feeding point for electrically connecting to the conductor element; and wherein the first feeding point and the second feeding point are provided at the diagonal positions of opposed sides when the first casing and the second casing are opened.

15. The portable radio device as set forth in claim 1, further comprising:

a circuit board, provided in the second casing;

a plurality of feeding portions, feeding electric current to the antenna element and being separated to each other;

a radio circuit, disposed in the circuit board; and a switching portion, provided between the plurality of feeding portions and the radio circuit and selecting any one of the plurality of the feeding portions to connect the radio circuit.

16. The portable radio device as set forth in claim 15, further comprising:

a control circuit, controlling the switching portion in accordance with the level of a receiving signal received by the radio circuit.

17. The portable radio device as set forth in claim 1, further comprising:

a circuit board, provided in the second casing;

a radio circuit, disposed in the circuit board and electrically connected to the feeding portion;

a ground portion, spaced from the feeding portion and connecting the antenna element to the circuit board; and a switching portion, switching whether the ground portion is connected to the circuit board or the ground portion and the circuit board are opened.

18. The portable radio device as set forth in claim 17, wherein a plurality of ground portions are provided; and wherein the ground portions are disposed so as to be spaced apart in the end part of the antenna element connected to the second casing.

19. The portable radio device as set forth in claim 18, wherein the switching portion switches the ground portions respectively.

20. The portable radio device as set forth in claim 17, wherein the connection portion has an electric conductivity; and wherein the ground portion is electrically connected to the antenna element through the connection portion.

21. The portable radio device as set forth in claim 1, wherein the first antenna element is an electric conductive frame forming a part of the first casing.

22. The portable radio device according to claim 21, wherein the conductor element is a ground pattern provided on a circuit board.

23. The portable radio device according to claim 1, wherein each of the at least two connection portions includes a first hinge portion provided in the first casing and a second hinge portion provided in the second casing, wherein the first hinge portion is connected to an end of the first antenna element, and wherein the second hinge portion is arranged away from the conductor element at the distance, and connected to each of the at least two feeding portions.

24. The portable radio device according to claim 23, wherein the connection portion is configured so that a capacity reactance occurs between the first hinge portion and the second hinge portion.

25. The portable radio device according to claim 1, wherein each of the at least two connection portions is connected to each of the at least two feeding portions, respectively.

26. The portable radio device according to claim 1, further comprising a switching portion provided in the second casing, and adapted to select any one of the at least two feeding portions to be electrically connected to a radio circuit disposed in the second casing.

27. A portable radio device comprising:

a first casing;

a second casing;

at least two connection portions, each connection portion connecting the first casing to the second casing so as to freely rotate through a rotation shaft provided in each of the at least two connection portions;

a first antenna element, provided in the first casing;

a conductor element, provided in the second casing; and at least two feeding portions provided in the second casing, each feeding portion having one end electrically connected to the first antenna element through each of the at least two connection portions including the rotation shaft and the other end electrically connected to the conductor element, wherein the connection portion including the rotation shaft has electric conductivity to form a dipole antenna as a whole by the first antenna element, the connection portion and the conductor element, wherein the connection portion is arranged away from the conductor element at a distance, and wherein the feeding portions are separate from each other along the rotation shaft in a prescribed gap, wherein each of the at least two connection portions includes a first hinge portion provided in the first casing and a second hinge portion provided in the second casing, wherein the first casing and the first antenna element are mechanically fixed to each of the first hinge portions, and wherein the second casing, each of the second hinge portions and each of the at least two feeding portions are respectively mechanically fixed.

* * * * *